US010979976B1

(12) United States Patent
Babaei

(10) Patent No.: US 10,979,976 B1
(45) Date of Patent: Apr. 13, 2021

(54) CONTROL CHANNEL MONITORING FOR UPLINK CANCELLATION INDICATION

(71) Applicant: Alireza Babaei, Fairfax, VA (US)

(72) Inventor: Alireza Babaei, Fairfax, VA (US)

(73) Assignee: PanPsy Technologies, LLC, Fairfax, VA (US)

( * ) Notice: Subject to any disclaimer, the term of this patent is extended or adjusted under 35 U.S.C. 154(b) by 0 days.

(21) Appl. No.: 17/090,549

(22) Filed: Nov. 5, 2020

Related U.S. Application Data

(60) Provisional application No. 62/932,485, filed on Nov. 7, 2019.

(51) Int. Cl.
| | |
|---|---|
| H04W 4/00 | (2018.01) |
| H04W 52/02 | (2009.01) |
| H04W 72/12 | (2009.01) |
| H04W 76/11 | (2018.01) |
| H04W 76/28 | (2018.01) |

(52) U.S. Cl.
CPC ... *H04W 52/0229* (2013.01); *H04W 52/0216* (2013.01); *H04W 72/1268* (2013.01); *H04W 72/1289* (2013.01); *H04W 76/11* (2018.02); *H04W 76/28* (2018.02); *H04W 52/0219* (2013.01)

(58) Field of Classification Search
CPC ......... H04W 52/0229; H04W 72/1289; H04W 76/11; H04W 52/0216; H04W 76/28; H04W 72/1268; H04W 52/0219
USPC ......................................... 370/329, 330, 311
See application file for complete search history.

(56) References Cited

U.S. PATENT DOCUMENTS

| | | | | |
|---|---|---|---|---|
| 2019/0254067 | A1* | 8/2019 | Al-Imari | H04W 72/14 |
| 2019/0268931 | A1* | 8/2019 | He | H04B 7/2615 |
| 2020/0259601 | A1* | 8/2020 | Zhou | H04L 5/0085 |
| 2020/0260486 | A1* | 8/2020 | Zhou | H04W 72/042 |
| 2020/0267764 | A1* | 8/2020 | Rastegardoost | H04W 74/0833 |
| 2020/0305183 | A1* | 9/2020 | Papasakellariou | H04W 52/54 |
| 2020/0314745 | A1* | 10/2020 | Yi | H04W 28/04 |
| 2020/0314811 | A1* | 10/2020 | Lin | H04L 5/0053 |
| 2020/0344747 | A1* | 10/2020 | Park | H04L 5/0053 |
| 2020/0351897 | A1* | 11/2020 | Fakoorian | H04L 5/1469 |

(Continued)

OTHER PUBLICATIONS

R1-1910070; 3GPP TSG RAN WG1 Meeting #98bis; Chongqing, China, Oct. 14-20, 2019; Agenda Item: 7.2.6.5; Source: Huawei, HiSilicon; Title: UL inter-UE transmission prioritization and multiplexing; Document for: Discussion and Decision.

(Continued)

*Primary Examiner* — Chuong T Ho
(74) *Attorney, Agent, or Firm* — Alireza Babaei

(57) ABSTRACT

A wireless device may receive uplink cancellation indication configuration parameters comprising a first radio network temporary identifier (RNTI). The wireless device monitors a common search space, for a control channel associated with the first RNTI, in a time duration that is based on a timing of a scheduled uplink transmission and regardless of being in a discontinuous reception (DRX) Active Time or not. The wireless device receives a cancellation indication downlink control information, associated with the first RNTI, indicating cancellation of uplink transmissions on first radio resources of the scheduled uplink transmission. The wireless device cancels the scheduled uplink transmission.

16 Claims, 26 Drawing Sheets

(56) References Cited

U.S. PATENT DOCUMENTS

2020/0359447 A1* 11/2020 Yang .................... H04W 24/08
2020/0389876 A1* 12/2020 Islam ................. H04W 72/042

OTHER PUBLICATIONS

R1-1910104; 3GPP TSG RAN WG1 #98bis; Chongqing, China, Oct. 14-20, 2019; Source: ZTE; Title: UL inter-UE multiplexing between eMBB and URLLC; Agenda item: 7.2.6.5; Document for: Discussion and Decision.

R1-1910168; 3GPP TSG RAN WG1 #98 bis; Chongqing, China, Oct. 14-20, 2019; Agenda item: 7.2.6.5 Source: CMCC; Title: Discussion on UL inter UE Tx prioritization/multiplexing; Document for: Discussion and Decision.

R1-1910225; 3GPP TSG RAN WG1 #98bis; Chongqing, China, Oct. 14-20, 2019; Source: vivo; Title: UL inter-UE Tx prioritization for URLLC; Agenda Item: 7.2.6.5; Document for Discussion and Decision.

R1-1910345; 3GPP TSG RAN WG1 Meeting #98bis; Chongqing, China, Oct. 14-20, 2019; Source: CATT; Title: Discussion on inter-UR UL multiplexing; Agenda Item: 7.2.6.5; Document for: Discussion and Decision.

R1-1910487; 3GPP TSG RAN WG1 #98bis; Chongqing, China, Oct. 14-20, 2019; Agenda item: 7.2.6.5; Source: Samsung; Title: UL inter-UE multiplexing/prioritization; Document for: Discussion and Decision.

R1-1910522; 3GPP TSG RAN WG1 #98bis; Chongqing, China, Oct. 14-20, 2019; Source: Panasonic; Title: On inter UE Tx prioritization/multiplexing enhancements for NR URLLC; Agenda Item: 7.2.6.5; Document for: Discussion.

R1-1910530; 3GPP TSG RAN WG1 #98bis; Chongqing, China, Oct. 14-18, 2019; Agenda Item: 7.2.6.5; Source: NEC; Title: Enhanced inter-UE Tx prioritisation and multiplexing; Document for: Discussion/Decision.

R1-1910549; 3GPP TSG-RAN WG1 Meeting #98bis; Chongqing, China, Oct. 14-20, 2019; Agenda Item: 7.2.6.5; Source: Ericsson; Title: Inter-UE Prioritization and Multiplexing of UL Transmissions; Document for: Discussion, Decision.

R1-1910623; 3GPP TSG RAN WG1 #98bis; Chongqing, China, Oct. 14-20, 2019; Source: OPPO; Title: Inter UE Tx prioritization and multiplexing; Agenda Item: 7.2.6.5; Document for: Discussion and Decision.

R1-1910664; 3GPP TSG RAN WG1 #98bis; Chongqing, China, Oct. 14-20, 2019; Source: Intel Corporation; Title: Enhancements to inter-UE multiplexing; Agenda item: 7.2.6.5; Document for: Discussion and Decision.

R1-1910772; 3GPP TSG RAN WG1 #98bis; Chongqing, China, Oct. 14-20, 2019; Agenda Item: 7.2.6.5; Source: Sony; Title: UL Inter UE transmission prioritisation & multiplexing; Document for: Discussion / decision.

R1-1910830; 3GPP TSG RAN WG1 #98bis; Chongqing, China, Oct. 14-20, 2019; Agenda Item: 7.2.6.5; Source: LG Electronics; Title: Discussion on UL inter UE Tx prioritization; Document for: Discussion and decision.

R1-1910868; 3GPP TSG RAN WG1 Meeting #98-Bis; Chongqing, China, Oct. 14-20, 2019; Agenda item: 7.2.6.5; Source: Nokia, Nokia Shanghai Bell; Title: UL inter-UE eMBB and URLLC multiplexing enhancements; Document for: Discussion and Decision.

R1-1910937; 3GPP TSG RAN WG1 Meeting #98b; Chongqing, China, Oct. 14-20, 2019; Source: Sharp; Title: UL cancelation indication design for enhanced inter UE Tx prioritization/multiplexing; Agenda Item: 7.2.6.5; Document for: Discussion and Decision.

R1-1911000; 3GPP TSG RAN WG1 #98bis; Chongqing, China, Oct. 14-20, 2019; Source: ETRI; Title: Enhanced inter UE Tx prioritization/multiplexing; Agenda Item: 7.2.6.5 Enhanced inter UE Tx prioritization/multiplexing; Document for: Discussion.

R1-1911082; 3GPP TSG RAN1 WG1 Meeting #98bis; Chongqing, China, Oct. 14-20, 2019; Agenda item: 7.2.6.5; Title: On uplink inter-UE transmission prioritization and multiplexing; Source: MediaTek Inc.; Document for: Discussion and Decision.

R1-1911122; 3GPP TSG-RAN WG1 #98b; Oct. 14-20, 2019; Chongqing, China; Agenda item: 7.2.6.5; Source: Qualcomm Incorporated; Title: Uplink Inter-UE Tx Multiplexing and Prioritization; Document for: Discussion/Decision.

R1-1911179; 3GPP TSG RAN WG1 #98bis; Chongqing, China, Oct. 14-20, 2019; Source: NTT DOCOMO, Inc.; Title: UL inter-UE transmission prioritization/multiplexing; Agenda Item: 7.2.6.5; Document for: Discussion and Decision.

R1-1911252; 3GPP TSG RAN WG1 #98bis; Chongqing, China, Oct. 14-20, 2019; Agenda Item: 7.2.6.5; Source: KT Corp.; Title: Considerations on Enhanced inter UE Tx prioritization/multiplexing; Document for: Discussion and Decision.

R1-1911300; 3GPP TSG RAN WG1 #98bis; Chongqing, China, Oct. 14-20, 2019; Agenda Item: 7.2.6.5; Source: Motorola Mobility, Lenovo; Title: Enhanced inter UE Tx prioritization/multiplexing for URLLC; Document for: Discussion.

R1-1911307; 3GPP TSG RAN WG1 #98bis; Chongqing, China, Oct. 14-20, 2019; Agenda Item: 7.2.6.5; Source: Sequans; Title: Considerations on UL inter-UE multiplexing for URLLC; Document for: Discussion and decision.

R1-1911318; 3GPP TSG RAN WG1 #98bis; Chongqing, China, Oct. 14-20, 2019; Source: WILUS Inc.; Title: On UL cancellation scheme for NR URLLC; Agenda item: 7.2.6.5; Document for: Discussion/Decision.

R1-1911327; 3GPP TSG RAN WG1 Meeting #98bis; Chongqing, China, Oct. 14-20, 2019; Source: CAICT; Title : Enhanced inter UE Tx prioritization/multiplexing for URLLC; Agenda Item : 7.2.6.5; Document for : Discussion / Decision.

R1-1911337; 3GPP TSG RAN WG1 #98bis; Chongqing, China, Oct. 14-20, 2019; Agenda Item: 7.2.6; Source: InterDigital Inc.; Title: Enhanced Inter UE Transmit prioritization/multiplexing for eURLLC; Document for: Discussion and Decision.

3GPP TS 38.211 V15.7.0 (Sep. 2019); Technical Specification; 3rd Generation Partnership Project; Technical Specification Group Radio Access Network; NR; Physical channels and modulation; (Release 15).

3GPP TS 38.212 V15.7.0 (Sep. 2019); Technical Specification; 3rd Generation Partnership Project; Technical Specification Group Radio Access Network; NR; Multiplexing and channel coding; (Release 15).

3GPP TS 38.213 V15.7.0 (Sep. 2019); Technical Specification; 3rd Generation Partnership Project; Technical Specification Group Radio Access Network; NR; Physical layer procedures for control; (Release 15).

3GPP TS 38.214 V15.7.0 (Sep. 2019); Technical Specification; 3rd Generation Partnership Project; Technical Specification Group Radio Access Network; NR; Physical layer procedures for data; (Release 15).

3GPP TS 38.300 V15.7.0 (Sep. 2019); Technical Specification; 3rd Generation Partnership Project; Technical Specification Group Radio Access Network; NR; NR and NG-RAN Overall Description; Stage 2; (Release 15).

3GPP TS 38.321 V15.7.0 (Sep. 2019); Technical Specification; 3rd Generation Partnership Project; Technical Specification Group Radio Access Network; NR; Medium Access Control (MAC) protocol specification; (Release 15).

3GPP TS 38.331 V15.7.0 (Sep. 2019); Technical Specification; 3rd Generation Partnership Project; Technical Specification Group Radio Access Network; NR; Radio Resource Control (RRC); Protocol specification; (Release 15 ).

R1-1911429; 3GPP TSG RAN WG1 Meeting #98bis; Chongqing, China, Oct. 14-18, 2019; Source: MCC Support; Title: Final Report of 3GPP TSG RAN WG1 #98 v2.0.0; (Prague, Czech Rep, Aug. 26-30, 2019); Document for: Approval.

R1-1907973; 3GPP TSG RAN WG1 Meeting #98; Prague, Czech Rep, Aug. 26-30, 2019; Source: MCC Support; Title: Final Report of 3GPP TSG RAN WG1 #97 v1.0.0; (Reno, USA, May 13-17, 2019); Document for: Approval.

(56) References Cited

OTHER PUBLICATIONS

R1-1905921; 3GPP TSG RAN WG1 Meeting #97; Reno, USA, May 13-17, 2019; Source: MCC Support; Title: Final Report of 3GPP TSG RAN WG1 #96b v1.0.0; (Xi'an, China, Apr. 8-12, 2019); Document for: Approval.

R1-1908055; 3GPP TSG RAN WG1 Meeting #98; Prague, Czech Republic, Aug. 26-30, 2019; Agenda Item: 7.2.6.5; Source: Huawei, HiSilicon; Title: UL inter-UE transmission prioritization and multiplexing; Document for: Discussion and Decision.

R1-1908125; 3GPP TSG RAN WG1 Meeting #98; Prague, Czech Republic, Aug. 26-30, 2019; Agenda Item: 7.2.6.5; Source: Ericsson; Title: Inter-UE Prioritization and Multiplexing of UL Transmissions; Document for: Discussion, Decision.

R1-1908162; 3GPP TSG RAN WG1 #98; Prague, CZ, Aug. 26-30, 2019; Source: vivo; Title: UL inter-UE Tx priontization for URLLC; Agenda Item: 7.2.6.5; Document for: Discussion and Decision.

R1-1908281; 3GPP TSG RAN WG1 #98; Prague, Czech Republic, Aug. 26-30, 2019; Agenda Item: 7.2.6.5; Source: NEC; Title: Enhanced inter-UE Tx prioritisation and multiplexing; Document for: Discussion/Decision.

R1-1908321; 3GPP TSG RAN WG1 #98; Prague, CZ, Aug. 26-30, 2019; Agenda Item: 7.2.6.5; Source: Fujitsu; Title: Discussion on UL cancellation indication; Document for: Discussion/Decision.

R1-1908412; 3GPP TSG RAN1 WG1 Meeting #98; Prague, Czech, Aug. 26-30, 2019; Agenda item: 7.2.6.5; Title: On uplink inter-UE transmission prioritization and multiplexing; Source: MediaTek Inc.; Document for: Discussion and Decision.

R1-1908545; 3GPP TSG RAN WG1 #98; Prague, CZ, Aug. 26-30, 2019; Agenda Item: 7.2.6.5; Source: LG Electronics; Title: Discussion on UL inter UE Tx prioritization; Document for: Discussion and decision.

R1-1908598; 3GPP TSG RAN WG1 Meeting #98; Prague, CZ, Aug. 26-30, 2019; Source: CATT; Title: Discussion on inter-UE UL multiplexing; Agenda Item: 7.2.6.5; Document for: Discussion and Decision.

R1-1908649; 3GPP TSG RAN WG1 Meeting #98; Prague, CZ, Aug. 26-30, 2019; Source: Intel Corporation; Title: Enhanced inter-UE Tx prioritization/multiplexing; Agenda item: 7.2.6.5; Document for: Discussion and Decision.

R1-1908671; 3GPP TSG RAN WG1 #98; Prague, Czech, Aug. 26-30, 2019; Source: OPPO; Title: Inter UE Tx prioritization and multiplexing; Agenda Item: 7.2.6.5; Document for: Discussion and Decision.

R1-1908781; 3GPP TSG RAN WG1 #98; Prague, CZ, Aug. 26-30, 2019; Agenda Item: 7.2.6.5; Source: Sony; Title: UL Inter UE transmission prioritisation & multiplexing; Document for: Discussion / decision.

R1-1908868; 3GPP TSG RAN WG1 #98; Prague, CZ, Aug. 26-30, 2019; Agenda item: 7.2.6.5; Source: CMCC; Title: Discussion on UL inter UE Tx prioritization/multiplexing; Document for: Discussion and Decision.

R1-1908969; 3GPP TSG RAN WG1 #98; Prague, USCZA, Aug. 26-30, 2019; Source: Panasonic; Title: On inter UE Tx prioritization/multiplexing enhancements for NR URLLC; Agenda Item: 7.2.6.5; Document for: Discussion.

R1-1908970; 3GPP TSG RAN WG1 Meeting #98; Prague, CZ, Aug. 26-30, 2019; Agenda item: 7.2.6.5; Source: Nokia, Nokia Shanghai Bell; Title: UL inter-UE eMBB and URLLC multiplexing enhancements; Document for: Discussion and Decision.

R1-1909103; 3GPP TSG RAN WG1 Meeting #98; Prague, CZ, Aug. 26-30, 2019; Source: Sharp; Title: UL cancelation indication design for enhanced inter UE Tx prioritization/multiplexing; Agenda Item: 7.2.6.5; Document for: Discussion and Decision.

R1-1909149; 3GPP TSG RAN WG1 #98; Prague, CZ, Aug. 26-30, 2019; Agenda Item: 7.2.6.5; Source: Motorola Mobility, Lenovo; Title: Enhanced inter UE Tx prioritization/multiplexing for URLLC; Document for: Discussion.

R1-1909197; 3GPP TSG RAN WG1 #98; Prague, CZ, Aug. 26-30, 2019; Source: NTT DOCOMO, Inc.; Title: UL inter-UE transmission prioritization/multiplexing; Agenda Item: 7.2.6.5; Document for: Discussion and Decision.

R1- 1909268; 3GPP TSG-RAN WG1 #98; Aug. 26-30, 2019; Prague, Czech Republic; Agenda item: 7.2.6.5; Source: Qualcomm Incorporated; Title: Uplink inter-UE Tx Multiplexing and Prioritization; Document for: Discussion/Decision.

R1-1909353; 3GPP TSG RAN WG1 Meeting #98; Prague, Czech, Aug. 26-30, 2019; Source: CAICT; Title: Enhanced inter UE Tx prioritization/multiplexing for URLLC; Agenda Item: 7.2.6.5; Document for Discussion / Decision.

R1-1909369; 3GPP TSG RAN WG1 #98; Prague, CZ, Aug. 26-30, 2019; Source: WILUS Inc.; Title: On UL cancellation scheme for NR URLLC; Agenda item: 7.2.6.5; Document for Discussion/Decision.

R1-1909411; 3GPP SG RAN WG1 #98; Prague, CZ, Aug. 26-30, 2019; Agenda Item: 7.2.6.5; Source: Sequans; Title: Considerations on UL inter-UE multiplexing for URLLC; Document for: Discussion and decision.

R1-1909453; 3GPP TSG RAN WG1 #98; Prague, Czech, Aug. 26-30, 2019; Agenda Item: 7.2.6.5; Source: InterDigital Inc.; Title: Enhanced Inter UE Transmit prioritization/multiplexing for eURLLC; Document for: Discussion and Decision.

R1-1909460; 3GPP TSG RAN WG1 #98; Prague, CZ, Aug. 26-30, 2019; Source: vivo; Title: Summary#1 of UL inter UE Tx prioritization/multiplexing; Agenda Item: 7.2.6.5; Document for: Discussion and Decision.

R1-1909774; 3GPP TSG RAN WG1 #98; Prague, CZ, Aug. 26-30, 2019; Source: vivo; Title: Summary#2 of UL inter UE Tx prioritization/multiplexing; Agenda Item: 7.2.6.5; Document for: Discussion and Decision.

* cited by examiner

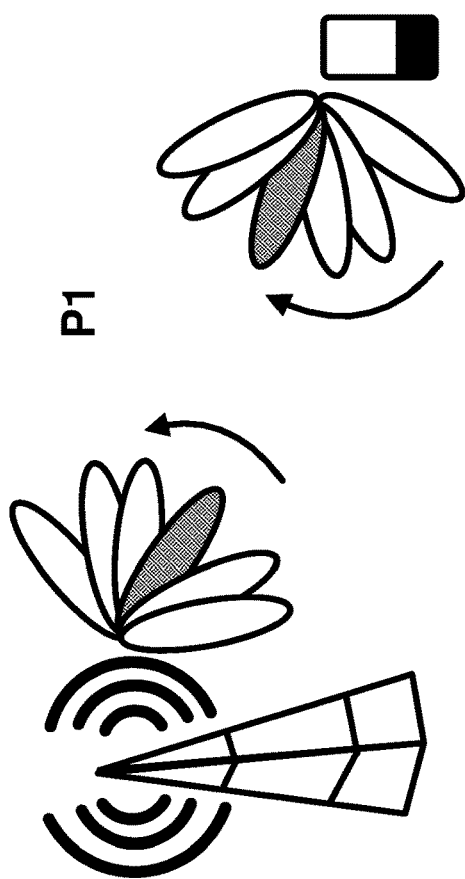
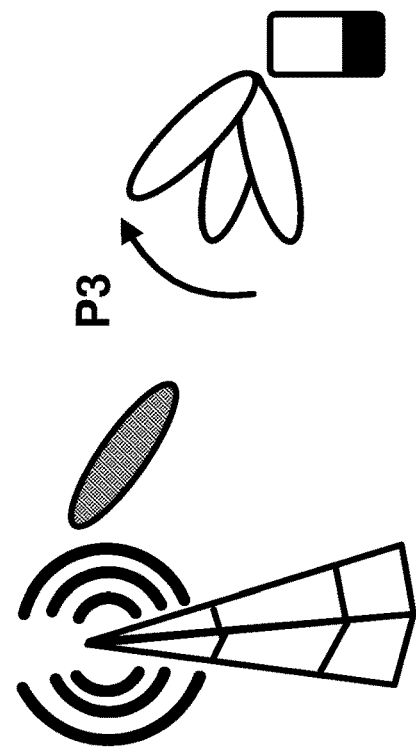
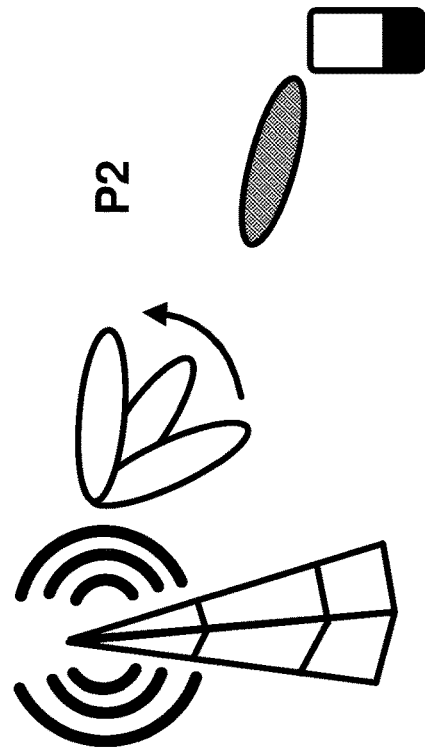
FIG. 14A
FIG. 14B
FIG. 14C

CONTROL CHANNEL MONITORING FOR UPLINK CANCELLATION INDICATION

CROSS-REFERENCE TO RELATED APPLICATIONS

This application claims the benefit of U.S. Provisional Application No. 62/932,485, filed Nov. 7, 2019, which is hereby incorporated by reference in its entirety.

BRIEF DESCRIPTION OF THE DRAWINGS

FIG. 14A, FIG. 14B and FIG. 14C show example beam management processes in accordance with several of various embodiments of the present disclosure.

DETAILED DESCRIPTION

The exemplary embodiments of the disclosed technology enable uplink cancellation indication operation in a wireless device and/or one or more base stations. The exemplary disclosed embodiments may be implemented in the technical field of wireless communication systems. More particularly, the embodiment of the disclosed technology may relate to monitoring control channel for uplink cancellation indication.

The devices and/or nodes of the mobile communications system disclosed herein may be implemented based on various technologies and/or various releases/versions/amendments of a technology. The various technologies include various releases of long-term evolution (LTE) technologies, various releases of 5G new radio (NR) technologies, various wireless local area networks technologies and/or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably.

Figure 1A:
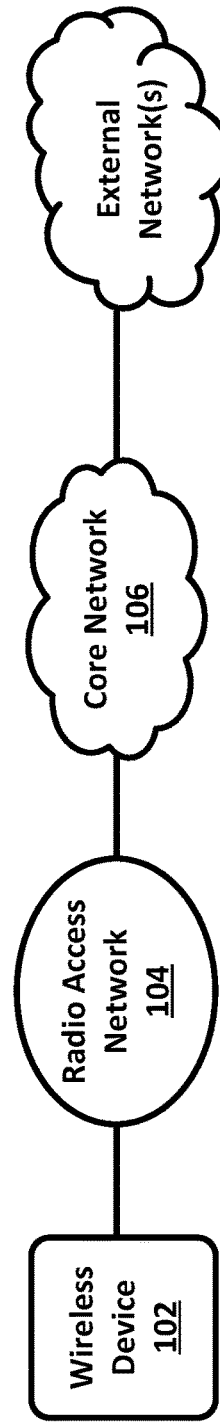
FIG. 1A and FIG. 1B show examples of mobile communications systems in accordance with several of various embodiments of the present disclosure.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some example, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

Figure 1B:
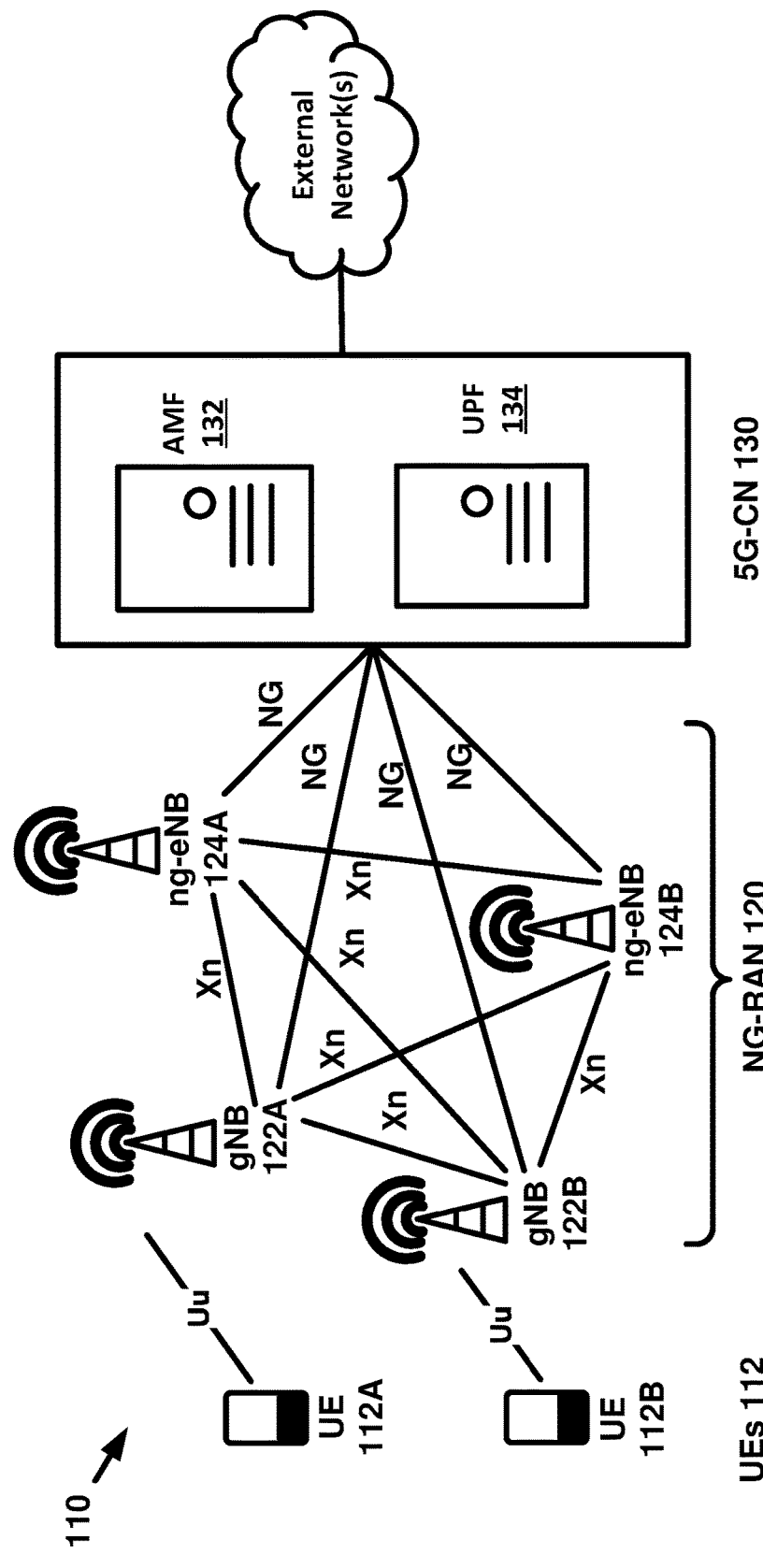

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNB s 124). The general terminology for gNB s 122 and/or an ng-eNBs 124 is a base station and may be used interchangeably in this disclosure. The gNBs 122 and the ng-eNBs 124 may include one or more antennas to communicate with the UEs 112. The one or more antennas of the gNB s 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone of operation, the 5G NR gNB is connected to a 5G-CN and the user plane and the control plane functionalities are provided by the 5G NR gNB.

Figure 2A:
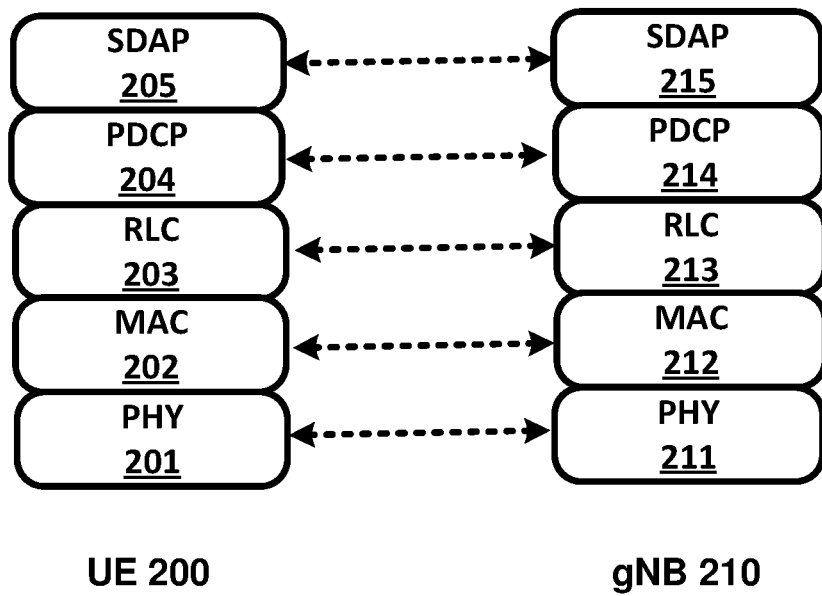
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
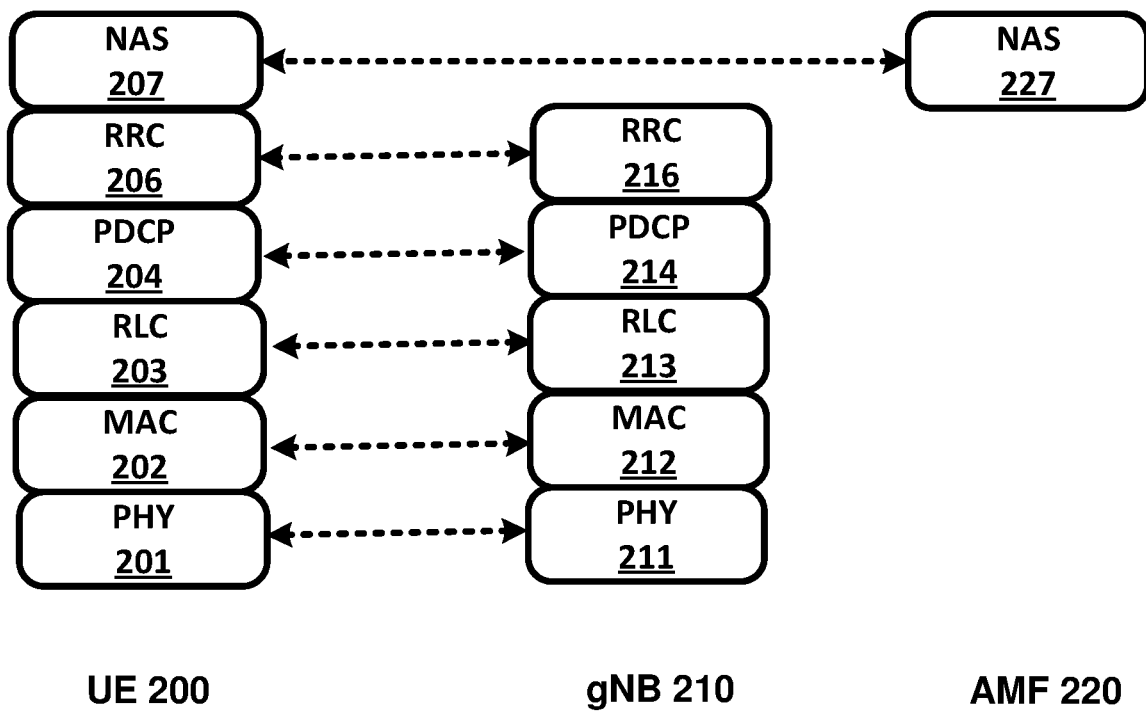

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
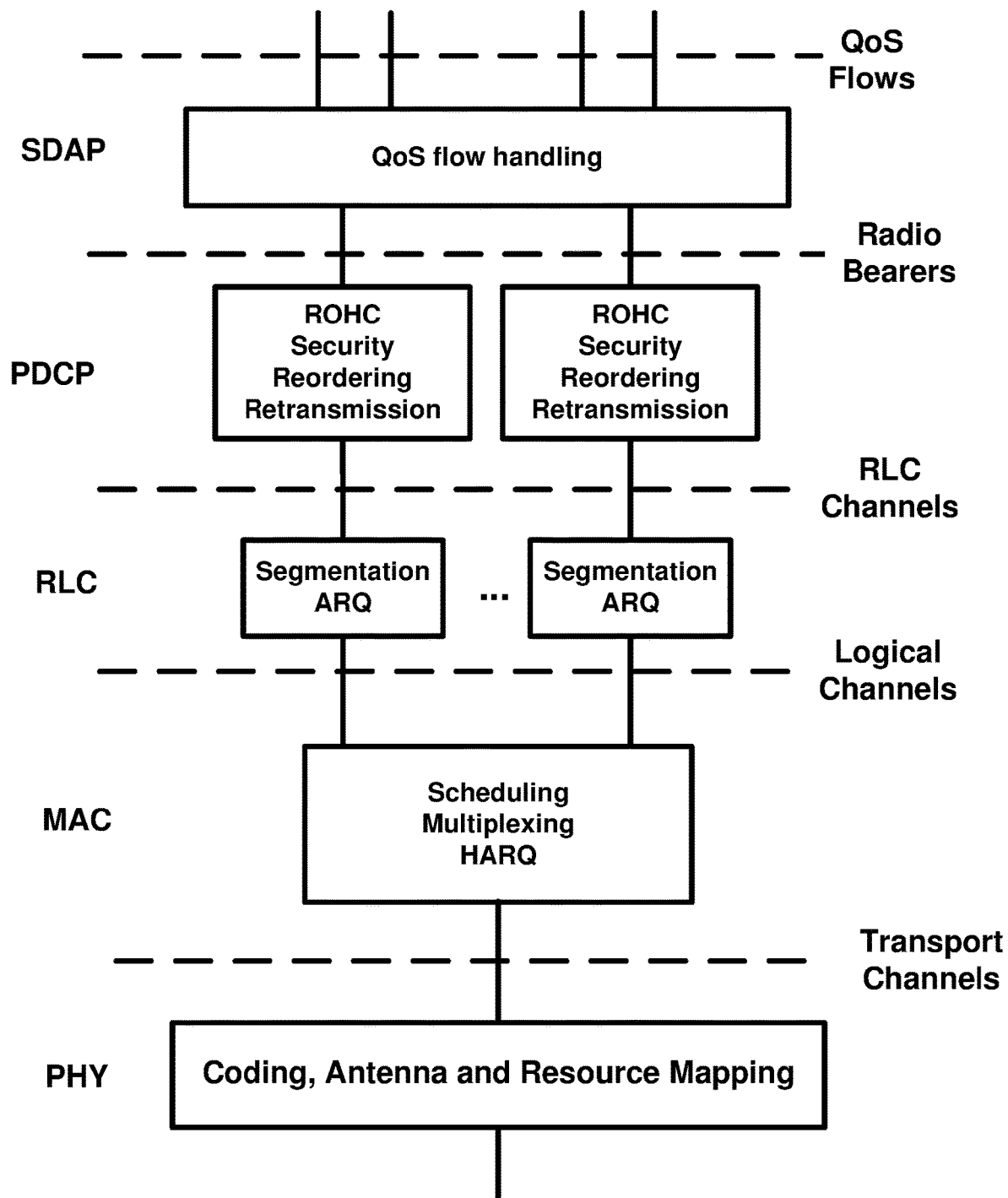
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
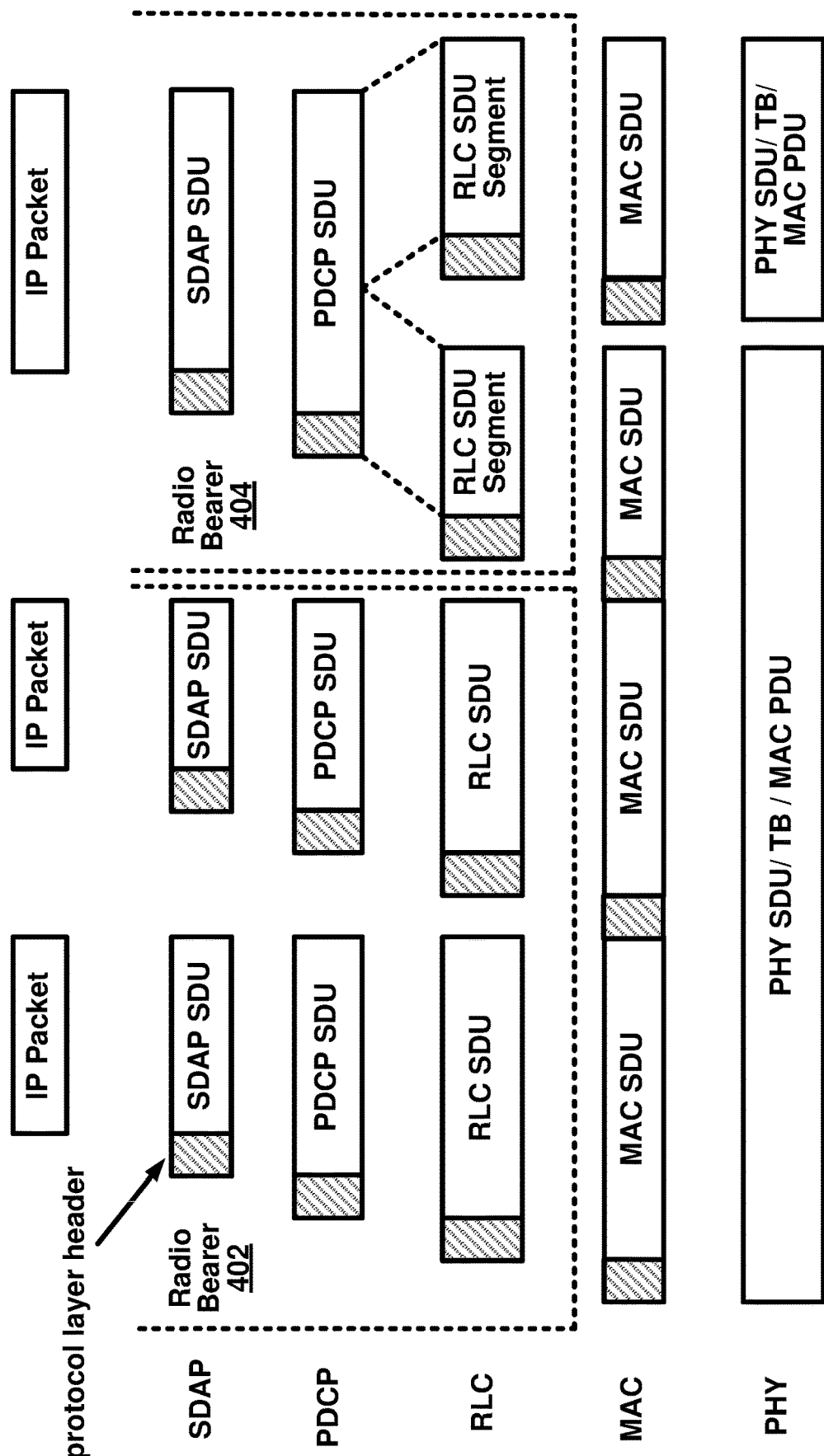
FIG. 4 shows example flow of packets through the protocol layers in accordance with several of various embodiments of the present disclosure.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
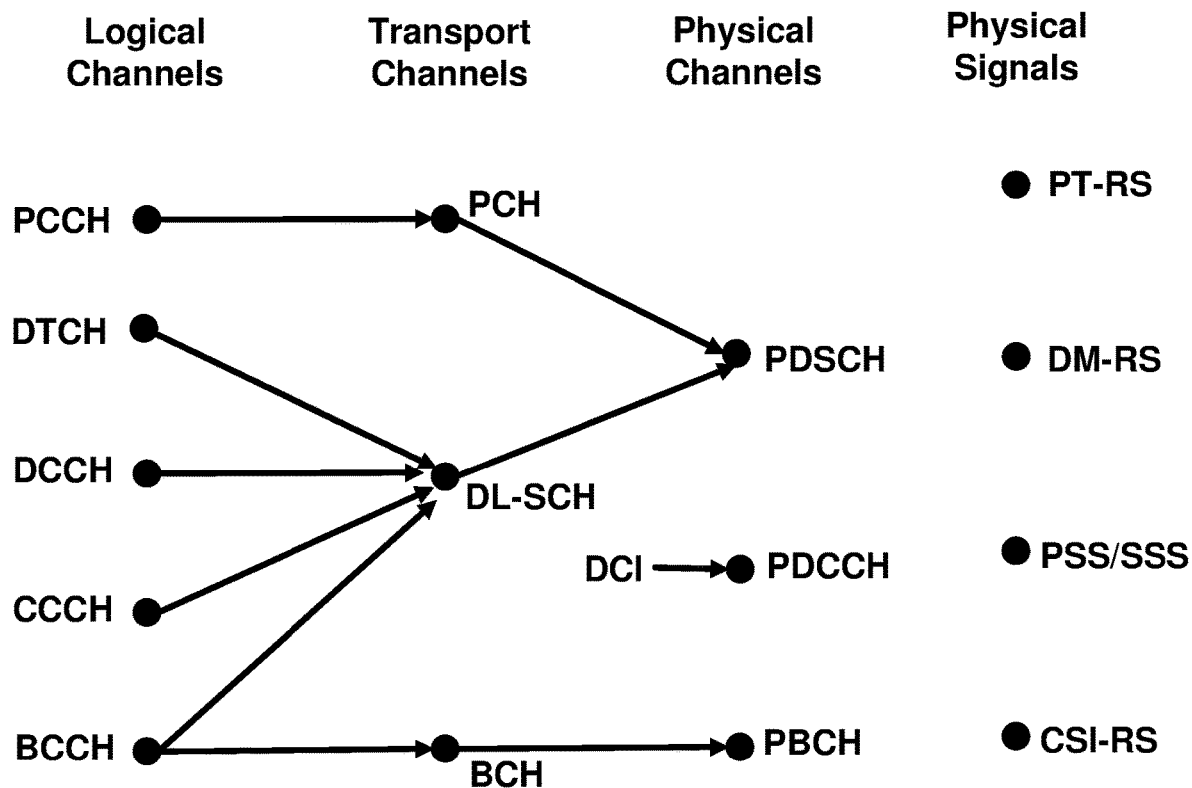
FIG. 5A shows example mapping of channels between layers of the protocol stack and different physical signals in downlink in accordance with several of various embodiments of the present disclosure.
Figure 5B:
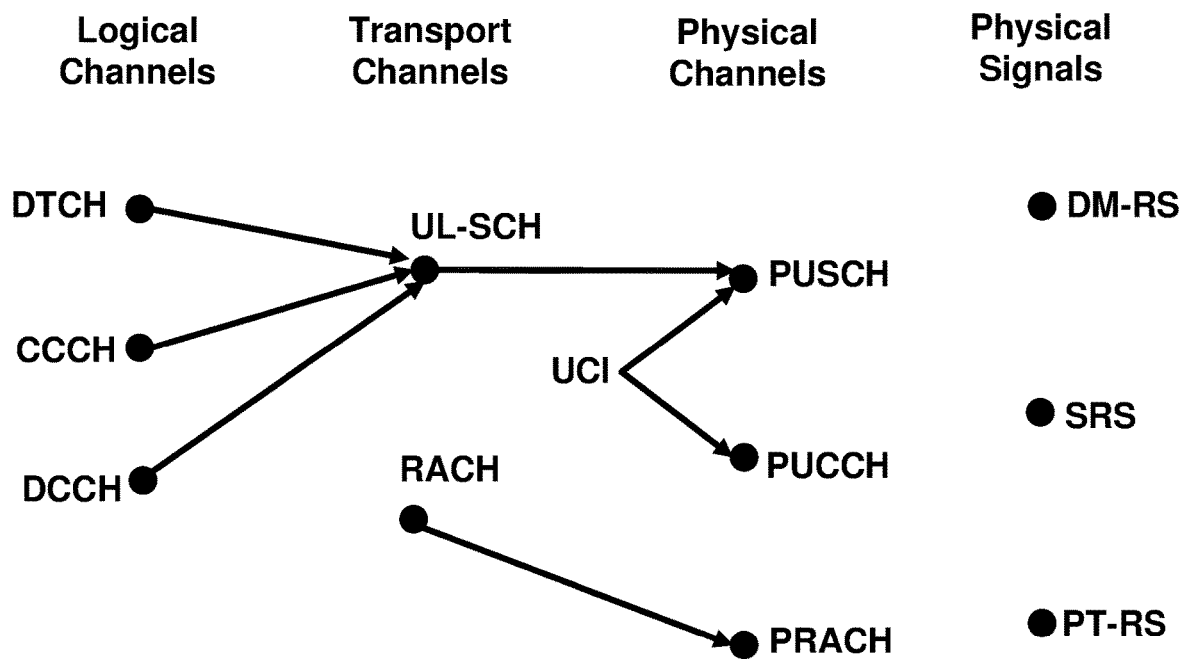
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
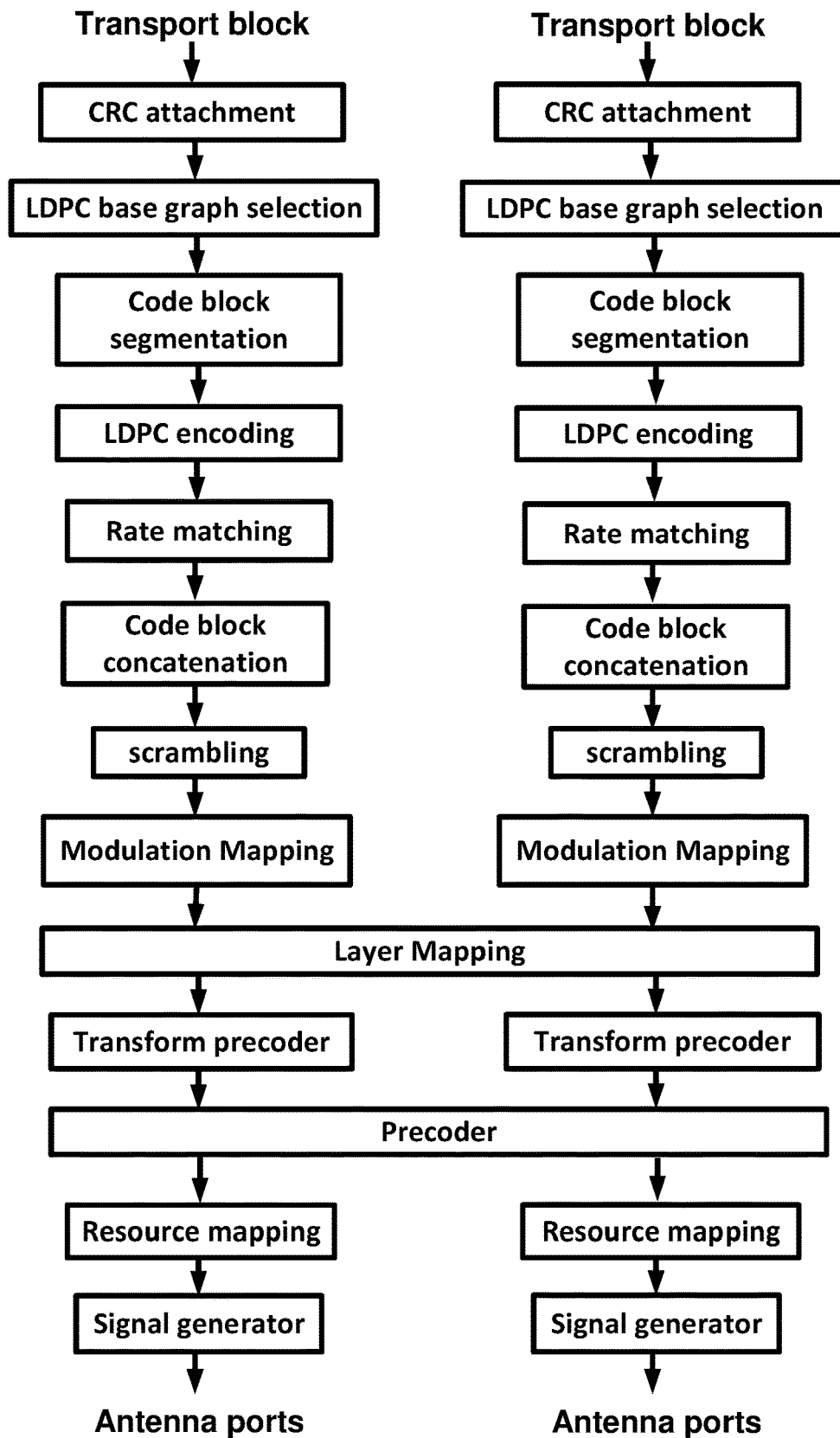
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
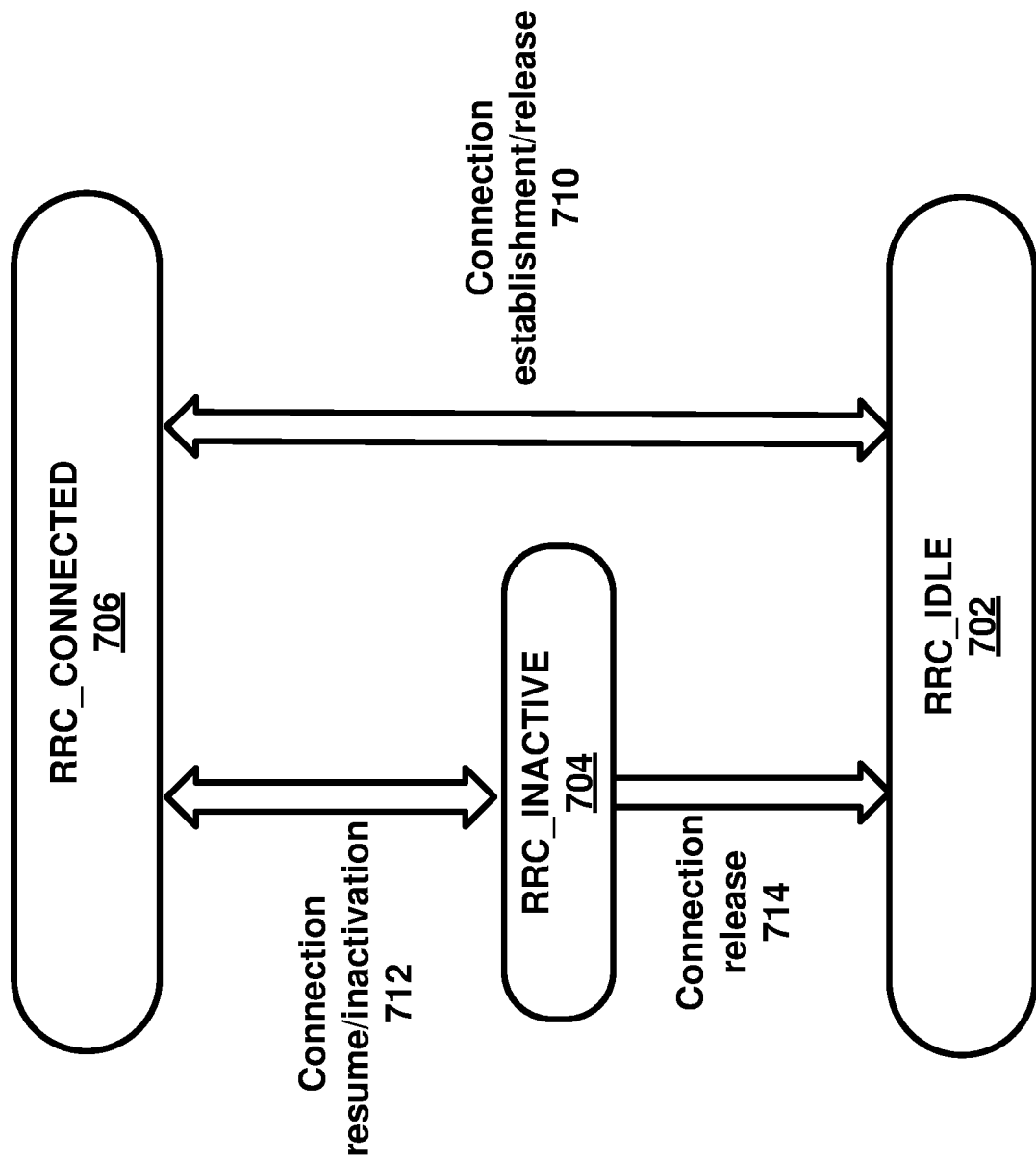
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), π/2-BPSK, Quadrature Phase Shift Keying (QPSK), 16 Quadrature Amplitude Modulation (16QAM), 64QAM and 256QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 μs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f = 2^\mu \cdot 15$ KHz ($\mu=0, 1, 2, \ldots$). Example subcarrier spacings used in NR include 15 KHz ($\mu=0$), 30 KHz ($\mu=1$), 60 KHz ($\mu=2$), 120 KHz ($\mu=3$) and 240 KHz ($\mu=4$). As discussed before, a duration of OFDM symbol is inversely proportional to the subcarrier spacing and therefor OFDM symbol duration may depend on the numerology (e.g. the μ value).

Figure 8:
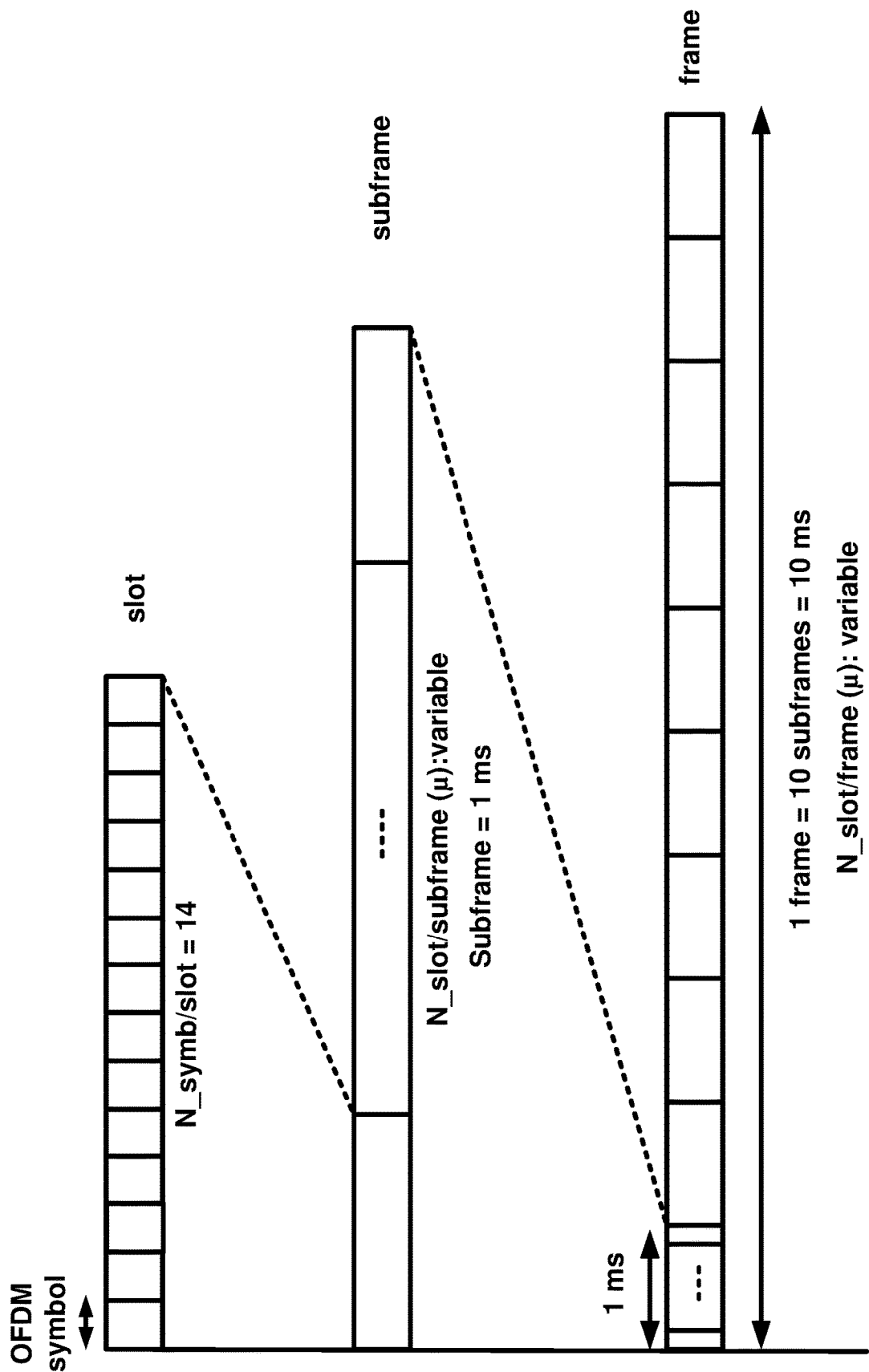
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $N_{symb}^{slot}$ OFDM symbols, wherein the $N_{symb}^{slot}$ may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of μ and may generally expressed as $N_{slot}^{subframe,\mu}$ and the number of symbols per subframe may be expressed as $N_{symb}^{subframe,\mu} = N_{symb}^{slot} N_{symb}^{subframe,\mu}$. A frame may have a duration of 10 ms and may consist of 10 subframes. The number of slots per frame may depend on the numerology and therefore may be variable. The number of slots per frame may generally be expressed as $N_{slot}^{frame,\mu}$.

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
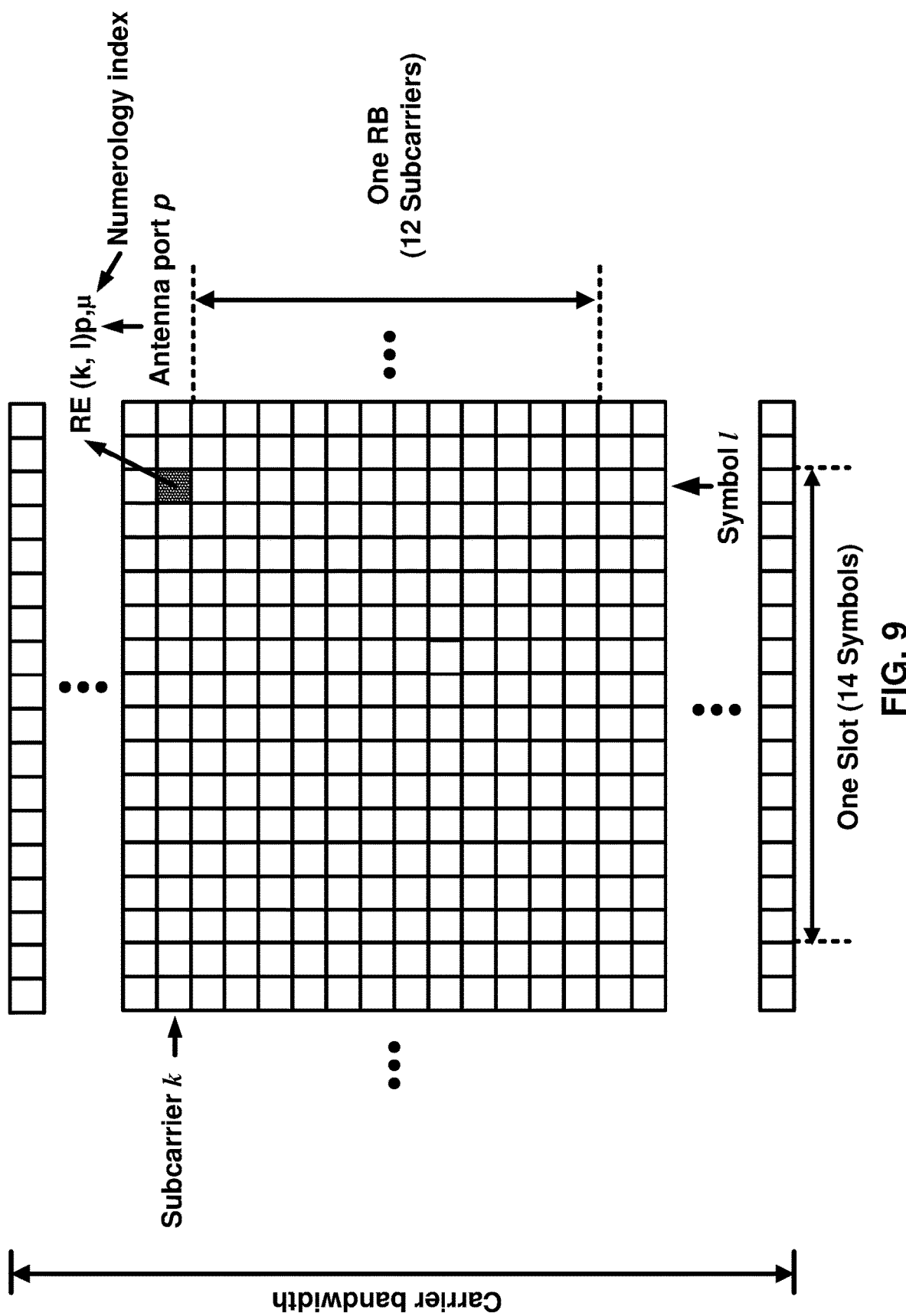
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration μ may be uniquely identified by $(k,l)_{p,\mu}$, where k is the index of a subcarrier in the frequency domain and l may refer to the symbol position in the time domain relative to some reference point. A resource block may be defined as $N_{SC}^{RB}=12$ subcarriers. Since subcarrier spacing depends on the numerology of OFDM transmission, the frequency domain span of a resource block may be variable and may depend on the numerology. For example, for a subcarrier spacing of 15 KHz (e.g., $\mu=0$), a resource block may be 180 KHz and for a subcarrier spacing of 30 KHz (e.g., $\mu=1$), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g. shrink during period of low activity to save power); the location of the transmit and/or receive bandwidth may move in the frequency domain (e.g. to increase scheduling flexibility); and the subcarrier spacing of the transmit or receive bandwidth may change (e.g. to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
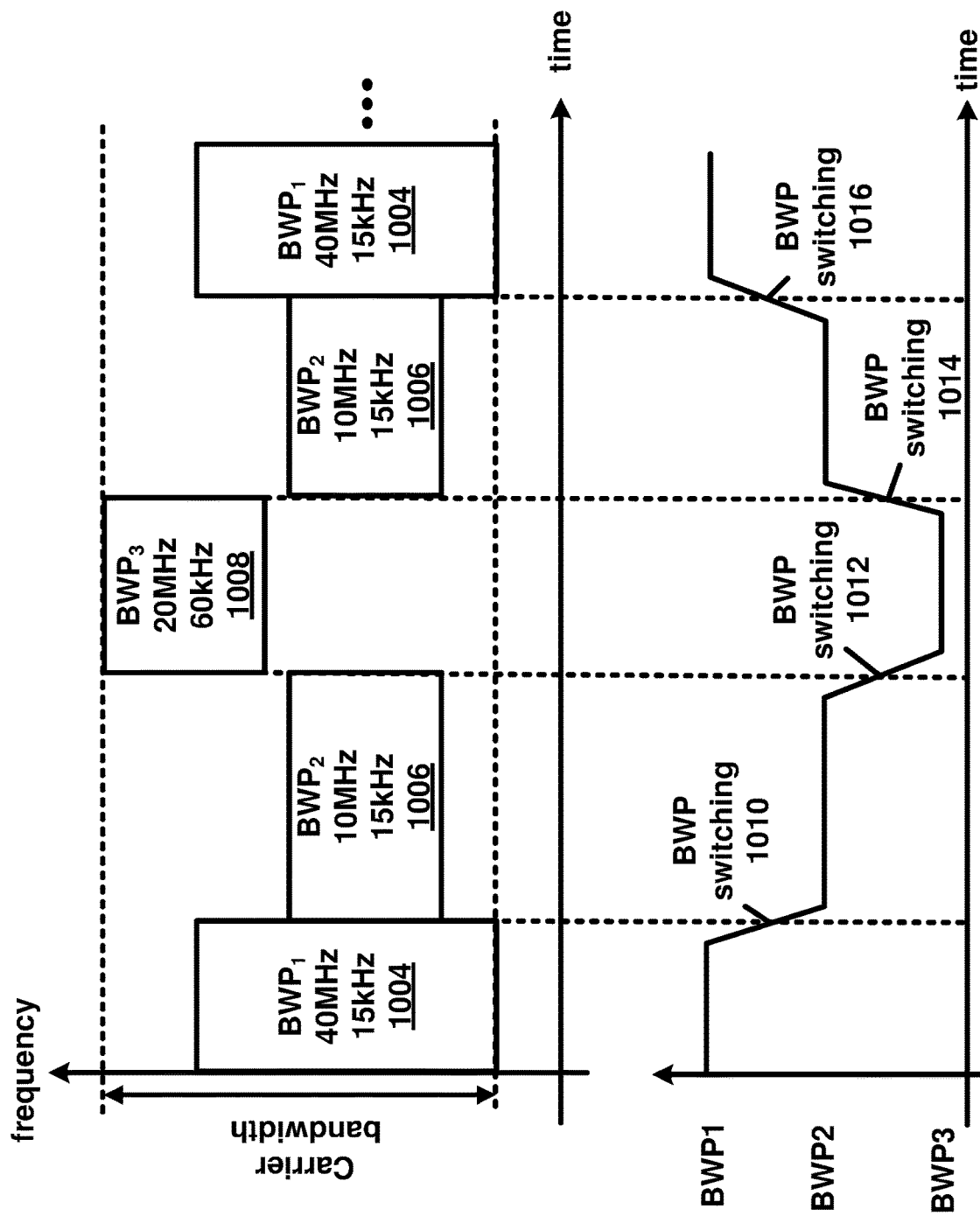
FIG. 10 shows example adaptation and switching of bandwidth parts in accordance with several of various embodiments of the present disclosure.

FIG. 10 shows an example of bandwidth part adaptation and switching. In this example, three BWPs (BWP$_1$ 1004, BWP$_2$ 1006 and BWP$_3$ 1008) are configured for a UE on a carrier bandwidth. The BWP$_1$ is configured with a bandwidth of 40 MHz and a numerology with subcarrier spacing of 15 KHz, the BWP$_2$ is configured with a bandwidth of 10 MHz and a numerology with subcarrier spacing of 15 KHz and the BWP$_3$ is configured with a bandwidth of 20 MHz and a subcarrier spacing of 60 KHz. The wireless device may switch from a first BWP (e.g., BWP$_1$) to a second BWP (e.g., BWP$_2$). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figure 11A:
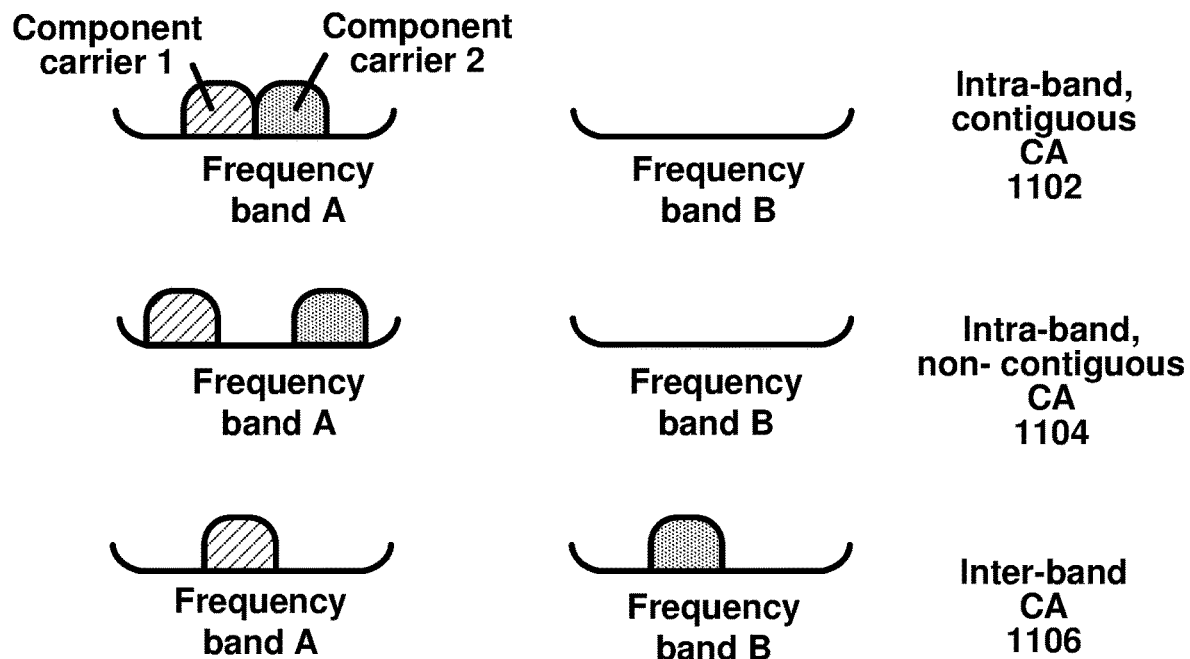
FIG. 11A shows example arrangements of carriers in carrier aggregation in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

Figure 11B:
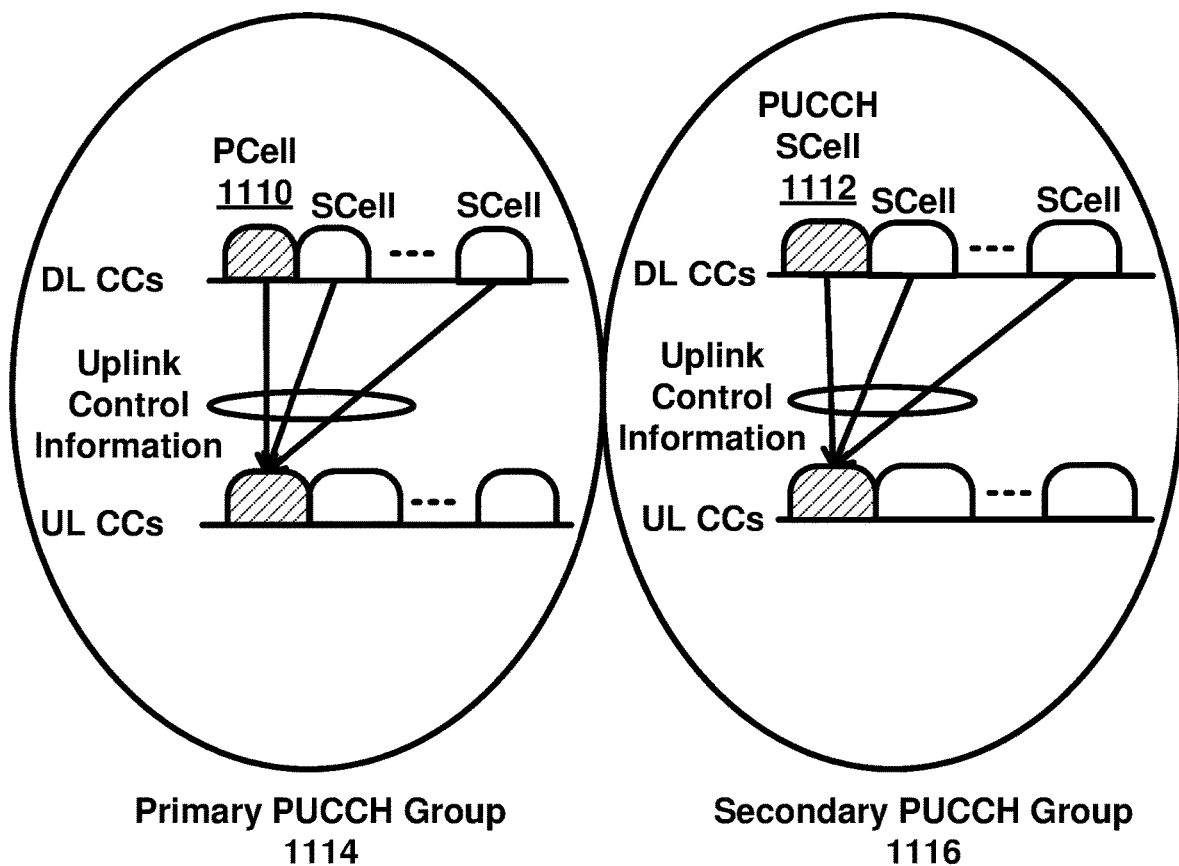
FIG. 11B shows examples of uplink control channel groups in accordance with several of various embodiments of the present disclosure.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

Figure 12C:
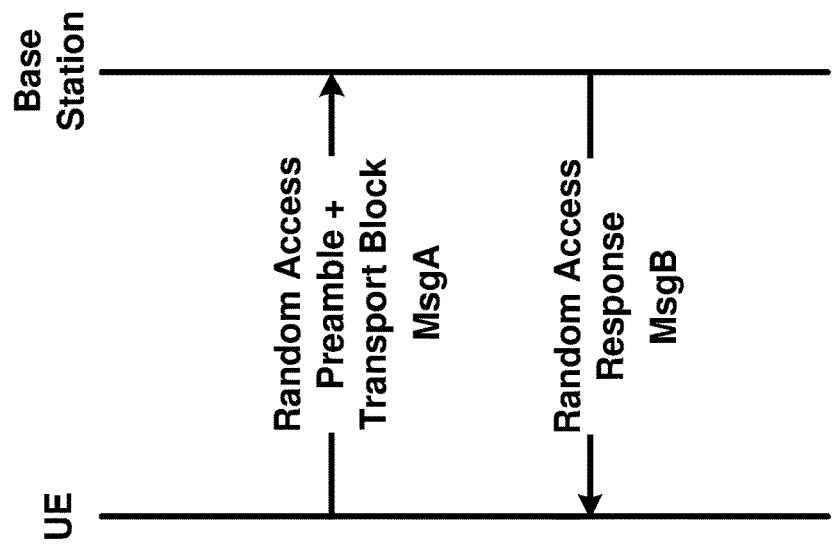
FIG. 12A, FIG. 12B and FIG. 12C show example random access processes in accordance with several of various embodiments of the present disclosure.
Figure 12B:
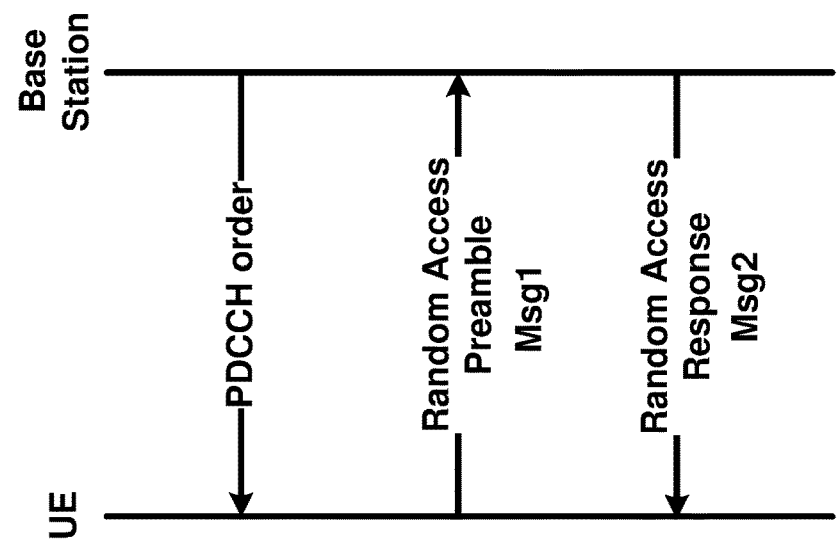
Figure 12A:
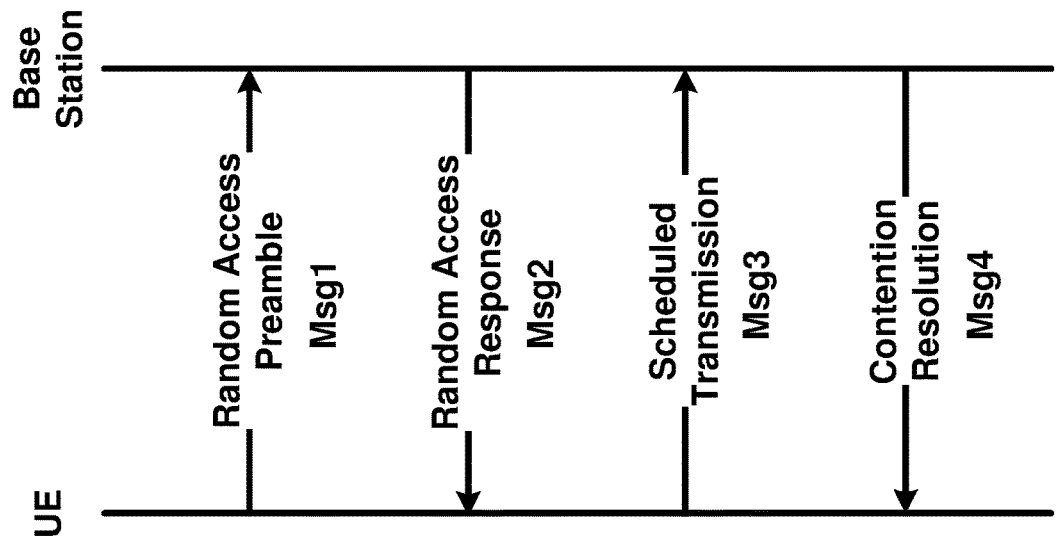

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SSs), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. The are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
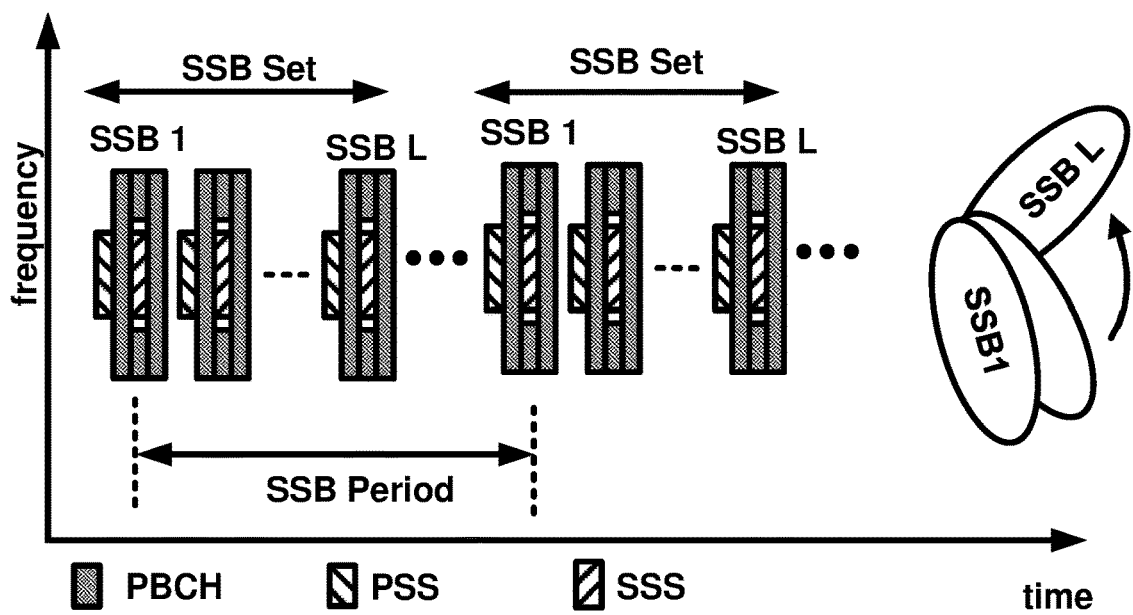
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RSs configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RSs are transmitted. For semi-persistent CSI-RS, the CSI-RS resources for CSI-RS transmissions may be activated and deactivated by using a semi-persistent (SP) CSI-CSI Resource Set Activation/Deactivation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RSs) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RSs) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RSs of wireless devices scheduled on overlapping frequency domain resources.

Figure 13B:
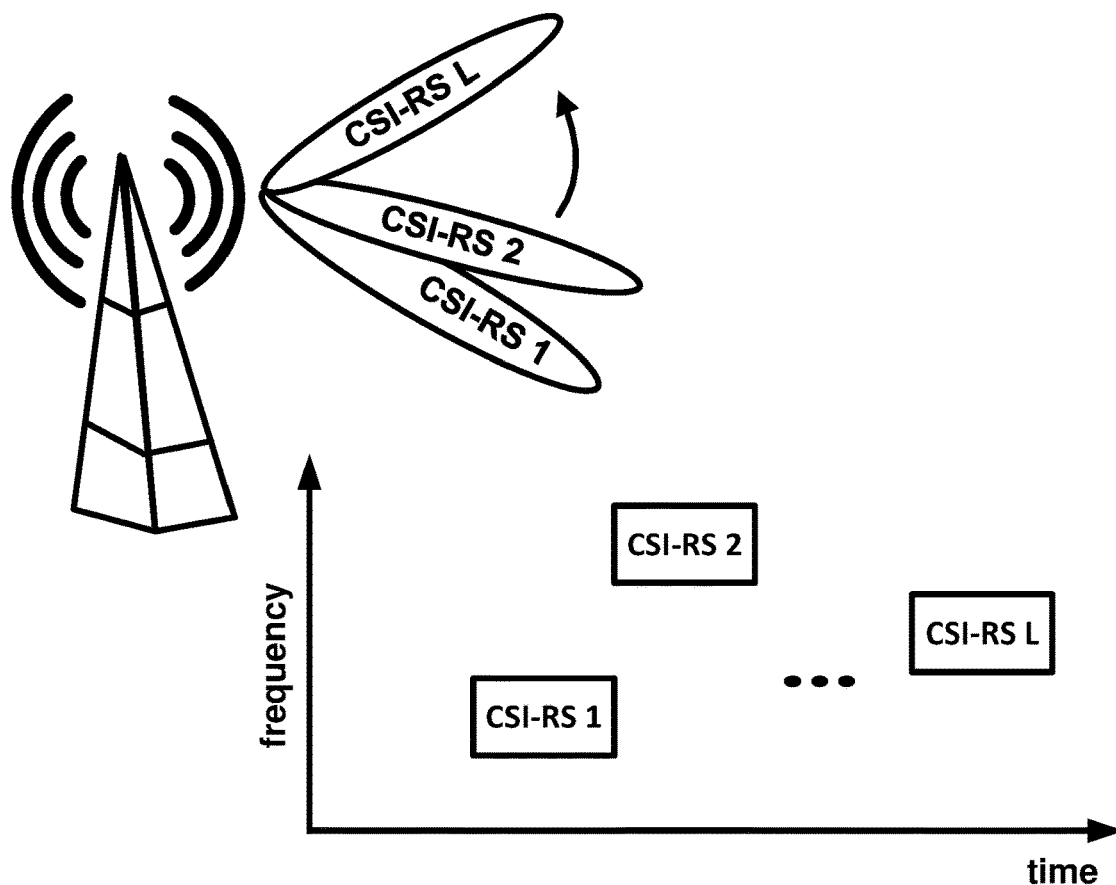
FIG. 13B shows example time and frequency structure of CSI-RSs and their association with beams in accordance with several of various embodiments of the present disclosure.

FIG. 13B shows example time and frequency structure of CSI-RSs and their association with beams in accordance with several of various embodiments of the present disclosure. A beam of the L beams shown in FIG. 13B may be associated with a corresponding CSI-RS resource. The base station may transmit the CSI-RSs using the configured CSI-RS resources and a UE may measure the CSI-RSs (e.g., received signal received power (RSRP) of the CSI-RSs) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configurating different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
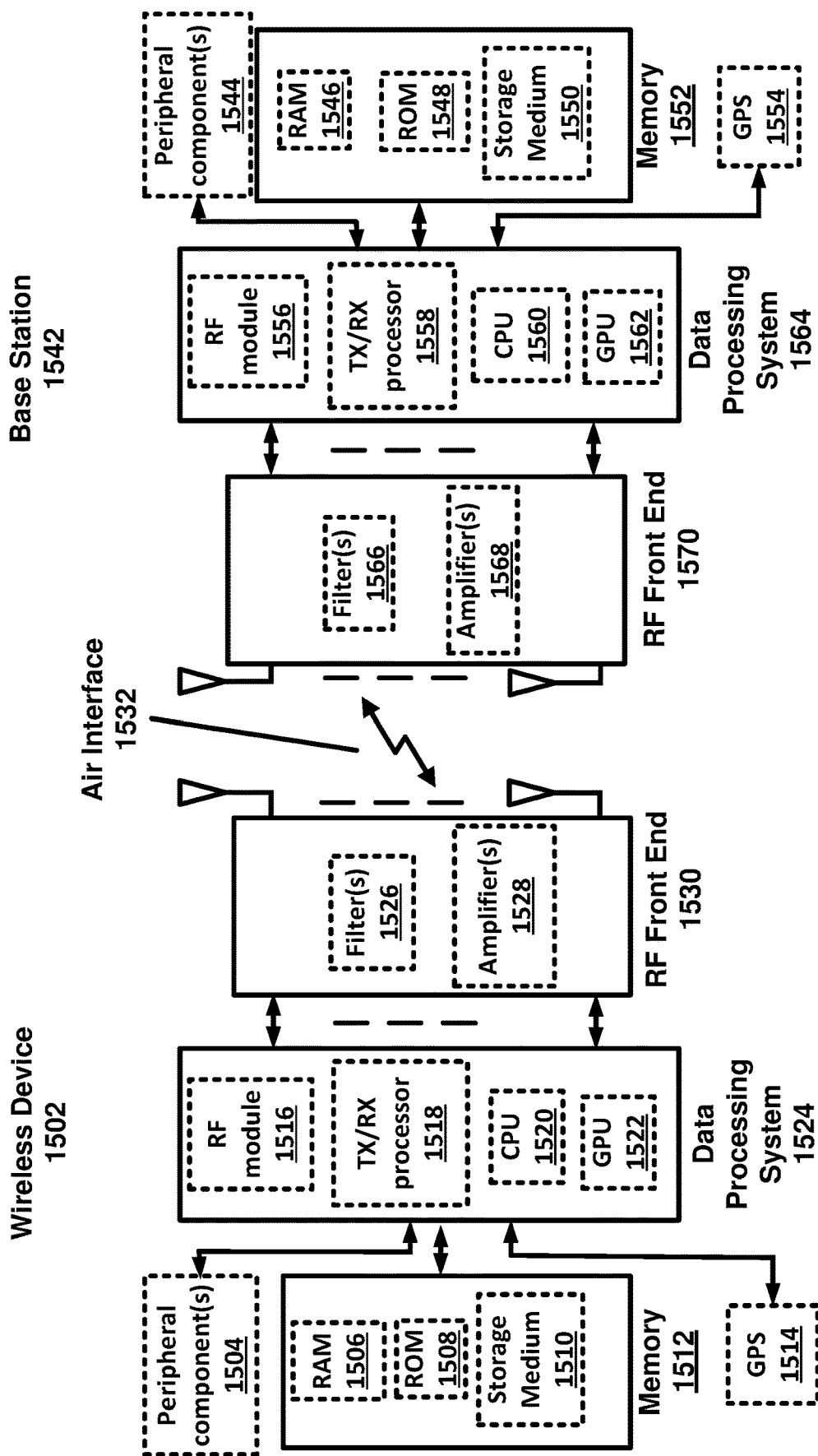
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System 1524 at the wireless device 1502 and Data Processing System 1564 at the base station 1542), Memory (e.g., Memory 1512 at the wireless device 1502 and Memory 1542 at the base station 1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier(s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System 1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System 1524 and/or the Data Processing System 1564. One or more processes described in the present disclosure may be implemented by the Data Processing System 1524 and/or the Data Processing System 1564. A Data Processing System may include an RF module (RF module 1516 at the Data Processing System 1524 and RF module 1556 at the Data Processing System 1564) and/or a TX/RX processor (e.g., TX/RX processor 1518 at the Data Processing System 1524 and TX/RX processor 1558 at the Data Processing System 1566) and/or a central processing unit (CPU) (e.g., CPU 1520 at the Data Processing System 1524 and CPU 1560 at the Data Processing System 1564) and/or a graphical processing unit (GPU) (e.g., GPU 1522 at the Data Processing System 1524 and GPU 1562 at the Data Processing System 1564).

The Memory 1512 may have interfaces with the Data Processing System 1524 and the Memory 1552 may have interfaces with Data Processing System 1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System 1524 and Data Processing System 1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System 1524 and/or the Data Processing System 1564 may be connected to other components such as a GPS module 1514 and a GPS module 1554, respectively, wherein the GPS module 1514 and a GPS module 1554 may enable delivery of location information of the wireless device 1502 to the Data Processing System 1524 and location information of the base station 1542 to the Data Processing System 1564. One or more other peripheral components (e.g., Peripheral Component(s) 1504 or Peripheral Component(s) 1544) may be configured and connected to the data Processing System 1524 and data Processing System 1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

In an example, a DCI format 2_1 may be used for notifying the PRB(s) and OFDM symbol(s) where UE may assume no transmission is intended for the UE. The following information may be transmitted by means of the DCI format 2_1 with CRC scrambled by INT-RNTI: Pre-emption indication 1, Pre-emption indication 2, . . . , Pre-emption indication N. The size of DCI format 2_1 may be configurable by higher layers up to 126 bits. A pre-emption indication is 14 bits.

In an example, a UE may receive configuration parameters comprising a DownlinkPreemption IE. The UE may be configured with an INT-RNTI provided by int-RNTI for monitoring PDCCH conveying DCI format 2_1. The UE may be additionally configured with: a set of serving cells by int-ConfigurationPerServingCell that includes a set of serving cell indexes provided by corresponding servingCellId and a corresponding set of locations for fields in DCI format 2_1 by positionInDCI; an information payload size for DCI format 2_1 by dci-PayloadSize; an indication granularity for time-frequency resources by timeFrequencySet.

In an example, if a UE detects a DCI format 2_1 for a serving cell from the configured set of serving cells, the UE may assume that no transmission to the UE is present in PRBs and in symbols that are indicated by the DCI format 2_1, from a set of PRBs and a set of symbols of the last monitoring period. The indication by the DCI format 2_1 may not be applicable to receptions of SS/PBCH blocks.

In an example, the set of PRBs may be equal to the active DL BWP as defined in Subclause 12 and may include $B_{INT}$ PRBs. In an example, if a UE detects a DCI format 2_1 in a PDCCH transmitted in a CORESET in a slot, the set of symbols may be the last $N_{symb}^{slot} \cdot T_{INT} \cdot 2^{\mu-\mu_{INT}}$ symbols prior to the first symbol of the CORESET in the slot where $T_{INT}$ may be the PDCCH monitoring periodicity provided by the value of monitoringSlotPeriodicityAndOffset $N_{symb}^{slot}$ is the number of symbols per slot, μ may be the SCS configuration for a serving cell with mapping to a respective field in the DCI format 2_1, $\mu_{INT}$ may be the SCS configuration of the DL BWP where the UE may receive the PDCCH with the DCI format 2_1. In an example, if the UE is provided tdd-UL-DL-ConfigurationCommon, symbols indicated as uplink by tdd-UL-DL-ConfigurationCommon may be excluded from the last $N_{symb}^{slot} \cdot T_{INT} \cdot 2^{\mu-\mu_{INT}}$ symbols prior to the first symbol of the CORESET in the slot. The resulting set of symbols may include a number of symbols that is denoted as $N_{INT}$.

In an example, the UE may be provided the indication granularity for the set of PRBs and for the set of symbols by timeFrequencySet. In an example, if the value of timeFrequencySet is 0, 14 bits of a field in DCI format 2_1 may have a one-to-one mapping with 14 groups of consecutive symbols from the set of symbols where each of the first $N_{INT}-\lfloor N_{INT}/14 \rfloor \cdot 14$ symbol groups includes $\lceil N_{INT}/14 \rceil$ symbols, each of the last $14-N_{INT}+\lfloor N_{INT}/14 \rfloor \cdot 14$ symbol groups may include $\lfloor N_{INT}/14 \rfloor$ symbols, a bit value of 0 may indicate transmission to the UE in the corresponding symbol group and a bit value of 1 may indicate no transmission to the UE in the corresponding symbol group.

In an example, if the value of timeFrequencySet is 1, 7 pairs of bits of a field in the DCI format 2_1 may have a one-to-one mapping with 7 groups of consecutive symbols where each of the first $N_{INT}-\lfloor N_{INT}/7 \rfloor \cdot 7$ symbol groups includes $\lceil N_{INT}/7 \rceil$ symbols, each of the last $7-N_{INT}+\lfloor N_{INT}/7 \rfloor \cdot 7$ symbol groups may include $\lfloor N_{INT}/7 \rfloor$ symbols, a first bit in a pair of bits for a symbol group may be applicable to the subset of first $\lceil B_{INT}/2 \rceil$ PRBs from the set of $B_{INT}$ PRBs, a second bit in the pair of bits for the symbol group may be applicable to the subset of last $\lfloor B_{INT}/2 \rfloor$ PRBs from the set of $B_{INT}$ PRBs, a bit value of 0 may indicate transmission to the UE in the corresponding symbol group and subset of PRBs, and a bit value of 1 may indicate no transmission to the UE in the corresponding symbol group and subset of PRBs.

In an example, an IE DownlinkPreemption may be used to configure the UE to monitor PDCCH for the INT-RNTI (interruption). The DownlinkPreemption may comprise one or more of following parameters: a dci-PayloadSize parameter indicating total length of the DCI payload scrambled with INT-RNTI; an int-ConfigurationPerServingCell parameter indicating (per serving cell) the position of the 14 bit INT values inside the DCI payload; an int-RNTI parameter indicating RNTI used for indication pre-emption in DL; a timeFrequencySet parameter indicating set selection for DL-preemption indication, wherein the set may determine how the UE may interpret the DL preemption DCI payload; and a positionInDCI parameter indicating starting position (in number of bit) of the 14 bit INT value applicable for this serving cell (servingCellId) within the DCI payload wherein the positionInDCI may be multiples of 14 (bit).

In an example, a MAC entity of a wireless device may be configured by RRC with a discontinuous reception (DRX) functionality that may controls the UE's PDCCH monitoring activity for the MAC entity's one or more RNTI (e.g., C-RNTI, CS-RNTI, INT-RNTI, SFI-RNTI, SP-CSI-RNTI, TPC-PUCCH-RNTI, TPC-PUSCH-RNTI, and TPC-SRS-RNTI). The MAC entity may monitor the PDCCH discontinuously for the activated Serving Cells using the DRX operation when the UE is in RRC_CONNECTED state and if DRX is configured.

In an example, RRC may control DRX operation by configuring one or more of the following parameters: drx-onDurationTimer: the duration at the beginning of a DRX Cycle; drx-SlotOffset: the delay before starting the drx-onDurationTimer; drx-InactivityTimer: the duration after the PDCCH occasion in which a PDCCH indicates a new UL or DL transmission for the MAC entity; drx-RetransmissionTimerDL (per DL HARQ process except for the broadcast process): the maximum duration until a DL retransmission is received; drx-RetransmissionTimerUL (per UL HARQ process): the maximum duration until a grant for UL retransmission is received; drx-LongCycleStartOffset: the Long DRX cycle and drx-StartOffset which defines the subframe where the Long and Short DRX Cycle starts; drx-ShortCycle (optional): the Short DRX cycle; drx-ShortCycleTimer (optional): the duration the UE shall follow the Short DRX cycle; drx-HARQ-RTT-TimerDL (per DL HARQ process except for the broadcast process): the minimum duration before a DL assignment for HARQ retransmission is expected by the MAC entity; drx-HARQ-RTT-TimerUL (per UL HARQ process): the minimum duration before a UL HARQ retransmission grant is expected by the MAC entity.

In an example, when a DRX cycle is configured, the Active Time may include the time while:drx-onDurationTimer or drx-InactivityTimer or drx-RetransmissionTimerDL or drx-RetransmissionTimerUL or ra-ContentionResolutionTimer is running; or a Scheduling Request is sent on PUCCH and is pending; or a PDCCH indicating a new transmission addressed to the C-RNTI of the MAC entity has not been received after successful reception of a Random Access Response for the Random Access Preamble not selected by the MAC entity among the contention-based Random Access Preamble.

In an example, when DRX is configured, if a MAC PDU is received in a configured downlink assignment, the MAC entity may start the drx-HARQ-RTT-TimerDL for the corresponding HARQ process in the first symbol after the end of the corresponding transmission carrying the DL HARQ feedback; and stop the drx-RetransmissionTimerDL for the corresponding HARQ process.

In an example, when DRX is configured, if a MAC PDU is transmitted in a configured uplink grant, the MAC entity may start the drx-HARQ-RTT-TimerUL for the corresponding HARQ process in the first symbol after the end of the first repetition of the corresponding PUSCH transmission; and stop the drx-RetransmissionTimerUL for the corresponding HARQ process.

In an example, when DRX is configured, if a drx-HARQ-RTT-TimerDL expires: if the data of the corresponding HARQ process was not successfully decoded: the MAC entity may start the drx-RetransmissionTimerDL for the corresponding HARQ process in the first symbol after the expiry of drx-HARQ-RTT-TimerDL.

In an example, when DRX is configured, if a drx-HARQ-RTT-TimerUL expires: the MAC entity may start the drx-RetransmissionTimerUL for the corresponding HARQ process in the first symbol after the expiry of drx-HARQ-RTT-TimerUL.

In an example, when DRX is configured, if a DRX Command MAC CE or a Long DRX Command MAC CE is received: the MAC entity may stop drx-onDurationTimer; and stop drx-InactivityTimer.

In an example, when DRX is configured, if drx-InactivityTimer expires or a DRX Command MAC CE is received: if the Short DRX cycle is configured: the MAC entity may start or restart drx-ShortCycleTimer in the first symbol after the expiry of drx-InactivityTimer or in the first symbol after the end of DRX Command MAC CE reception; and use the Short DRX Cycle.

In an example, when DRX is configured, if drx-InactivityTimer expires or a DRX Command MAC CE is received: if the Short DRX cycle is not configured: the MAC entity may use the Long DRX cycle.

In an example, when DRX is configured, if drx-ShortCycleTimer expires: the MAC entity may use the Long DRX cycle.

In an example, when DRX is configured, if a Long DRX Command MAC CE is received: the MAC entity may stop drx-ShortCycleTimer; and use the Long DRX cycle.

In an example, if the Short DRX Cycle is used, and [(SFN×10)+subframe number] modulo (drx-ShortCycle)= (drx-StartOffset) modulo (drx-ShortCycle); or if the Long DRX Cycle is used, and [(SFN×10)+subframe number] modulo (drx-LongCycle)=drx-StartOffset: the MAC entity may start drx-onDurationTimer after drx-SlotOffset from the beginning of the subframe.

In an example, when DRX is configured, if the MAC entity is in Active Time: the MAC entity may monitor the PDCCH. If the PDCCH indicates a DL transmission: the MAC entity may start the drx-HARQ-RTT-TimerDL for the corresponding HARQ process in the first symbol after the end of the corresponding transmission carrying the DL HARQ feedback; and stop the drx-RetransmissionTimerDL for the corresponding HARQ process. If the PDCCH indicates a UL transmission: the MAC entity may start the drx-HARQ-RTT-TimerUL for the corresponding HARQ process in the first symbol after the end of the first repetition of the corresponding PUSCH transmission; and stop the drx-RetransmissionTimerUL for the corresponding HARQ process. If the PDCCH indicates a new transmission (DL or UL): the MAC entity may start or restart drx-InactivityTimer in the first symbol after the end of the PDCCH reception.

In an example, when DRX is configured, in current symbol n, if the MAC entity would not be in Active Time considering grants/as signments/DRX Command MAC CE/Long DRX Command MAC CE received and Scheduling Request sent until 4 ms prior to symbol n when evaluating DRX Active Time conditions: the MAC entity may not transmit periodic SRS and semi-persistent SRS; and the MAC entity may not report CSI on PUCCH and semi-persistent CSI on PUSCH.

In an example, when DRX is configured, if CSI masking (csi-Mask) is setup by upper layers: in current symbol n, if drx-onDurationTimer would not be running considering grants/assignments/DRX Command MAC CE/Long DRX Command MAC CE received until 4 ms prior to symbol n when evaluating DRX Active Time conditions: the MAC entity may not report CSI on PUCCH.

In an example, regardless of whether the MAC entity is monitoring PDCCH or not, the MAC entity may transmit HARQ feedback, aperiodic CSI on PUSCH, and aperiodic SRS when such is expected.

In an example, the MAC entity may need not to monitor the PDCCH if it is not a complete PDCCH occasion (e.g. the Active Time starts or ends in the middle of a PDCCH occasion).

In an example, PDCCH may be used for UL cancelation indication. In an example, based on detecting an UL cancelation indication, the wireless device may stop an uplink transmission without resuming. In an example, the UL transmission may include one or more of dynamically scheduled UL transmissions (e.g., PUSCH, PUCCH, and SRS), semi-persistent UL transmissions (e.g., PUSCH, PUCCH, SRS), Periodic UL transmissions (e.g., configured grant PUSCH, PUCCH, SRS) and PRACH.

In an example, the UL cancellation indication may be indicated using a group common DCI.

In an example, a time/frequency region may be provided in the cancelation indication DCI for a group of UEs to derive the UL cancelation behavior. In an example, UL cancellation indication may be separately provided for each UE in a group common DCI.

In an example, for a UE supporting UL cancellation, the UE may be configured with slot-level or mini-slot level monitoring for UL cancellation indication monitoring. For mini-slot level monitoring, monitoring occasion and number for blind decoding for UL cancellation indication may be configurable.

In an example, upon receiving UL cancellation indication, UE may determine the starting position of cancelled time resources based on one or more of the following: slot and/or symbol offset indicated by DCI relative to the ending symbol PDCCH CORESET carrying the UL cancellation indication plus the minimum UE processing time for cancelation operation; slot and/or symbol offset configured by RRC relative to the ending symbol PDCCH CORESET carrying the UL cancellation indication plus the minimum UE processing time for cancelation operation; and symbol-level offset implicitly determined based on the ending symbol PDCCH CORESET carrying the UL cancellation indication plus the minimum UE processing time for cancelation operation.

In an example, a wireless device may apply the UL cancellation in one slot. The UE may cancel the UL transmission in one slot given by UL cancellation indication until the boundary of the slot. In an example, UL cancellation may be applied for multiple slots.

In an example, for UL transmission with associated PDCCH, UE may start UL CI monitoring after the PDCCH is decoded. In an example, UE may monitor UL CI at least at the latest monitoring occasion ending no later than X symbols before the start of the UL transmission, and X may be related to UL CI processing time. For UL transmission without associated PDCCH, UE may monitor UL CI at least at the latest monitoring occasion that ends no later than X symbols before the start of the UL transmission, In an example, the RRC configuration parameters for UL cancellation indication may indicate a new RNTI (e.g. CI-RNTI) for UL Cancellation Indication. The DCI payload size for UL CI may be configured by RRC.

In an example, for UL transmissions with and without associated PDCCH, UE may start monitoring UL CI at least at the latest monitoring occasion ending no later than X symbols before the start of the UL transmission, and X may be related to UL CI processing time. The UE may stop monitoring UL CI from X symbols before the end of relevant UL transmission, and X may be related to UL CI processing time.

In an example, a MAC entity of the wireless device may not generate a MAC PDU for the HARQ entity based on the one or more of following conditions being satisfied: the MAC entity being configured with a first skipping parameter (e.g., skipUplinkTxDynamic) with value true and the grant indicated to the HARQ entity being addressed to one or more RNTIs (e.g., a C-RNTI), or the grant indicated to the HARQ entity being a configured uplink grant; no aperiodic CSI being requested for a PUSCH transmission; the MAC PDU including zero MAC SDUs; the MAC PDU including only the periodic BSR and no data being available for any LCG, or the MAC PDU including only the padding BSR. In an example, the skipping parameter may be configured for a cell group (e.g., a MAC cell group and/or MAC entity). The skipping parameter may be a Boolean parameter taking a value of true or false. The wireless device may receive an RRC message indicating the skipping parameter. The skipping process may be based on a wireless device capability and the base station may configure the skipping for a wireless device based on the wireless device supporting this capability. In an example, the wireless device may transmit, to the base station, one or more messages comprising a plurality of wireless device capabilities including the wireless device capability to support skipping.

In an example, a MAC entity of a wireless device may be configured with a plurality of secondary cells (SCells). Based on the MAC entity being configured with one or more SCells, the network may activate and/or deactivate the configured SCells. Upon configuration of an SCell, the SCell may be deactivated.

The configured SCell(s) may be activated and/or deactivated by: receiving an SCell Activation/Deactivation MAC CE; configuring sCellDeactivationTimer timer per configured SCell (except the SCell configured with PUCCH, if any) and an SCell being deactivated based on the associated SCell deactivation timer expiring.

In an example, if an SCell Activation/Deactivation MAC CE is received indicating activation of an SCell, the MAC entity may activate the SCell according to a timing. The activating the SCell may comprise applying normal SCell operations including SRS transmissions on the SCell; CSI reporting for the SCell; PDCCH monitoring on the SCell; PDCCH monitoring for the SCell; PUCCH transmissions on the SCell, if configured. If the SCell was deactivated prior to receiving this SCell Activation/Deactivation MAC CE: the MAC entity may activate the DL BWP and UL BWP indicated by firstActiveDownlinkBWP-Id and firstActiveUplinkBWP-Id respectively. The MAC entity may start or restart the sCellDeactivationTimer associated with the SCell according to a timing. The MAC entity may (re-)initialize suspended configured uplink grants of configured grant Type 1 associated with the SCell according to the stored configuration, if any, and to start in the symbol according to rules. The MAC entity may trigger power headroom report (PHR).

In an example, if an SCell Activation/Deactivation MAC CE is received indicating deactivation of the SCell; or if the sCellDeactivationTimer associated with the activated SCell expires: the MAC entity may deactivate the SCell according to a timing; the MAC entity may stop the sCellDeactivationTimer associated with the SCell; the MAC entity may stop the bwp-InactivityTimer associated with the SCell; the MAC entity may deactivate any active BWP associated with the SCell; the MAC entity may clear any configured downlink assignment and any configured uplink grant Type 2 associated with the SCell respectively; the MAC entity may clear any PUSCH resource for semi-persistent CSI reporting associated with the SCell; the MAC entity may suspend any configured uplink grant Type 1 associated with the SCell; the MAC entity may flush HARQ buffers associated with the SCell.

In an example, if PDCCH on the activated SCell indicates an uplink grant or downlink assignment; or if PDCCH on the Serving Cell scheduling the activated SCell indicates an uplink grant or a downlink assignment for the activated SCell; or if a MAC PDU is transmitted in a configured uplink grant or received in a configured downlink assignment: the MAC entity may restart the sCellDeactivationTimer associated with the SCell.

In an example, if the SCell is deactivated: the MAC entity may not transmit SRS on the SCell; the MAC entity may not report CSI for the SCell; the MAC entity may not transmit on UL-SCH on the SCell; the MAC entity may not transmit on RACH on the SCell; the MAC entity may not monitor the PDCCH on the SCell; the MAC entity may not monitor the PDCCH for the SCell; and the MAC entity may not transmit PUCCH on the SCell.

In an example, HARQ feedback for a MAC PDU containing SCell Activation/Deactivation MAC CE may not be impacted by PCell, PSCell and PUCCH SCell interruptions due to SCell activation/deactivation. In an example, when SCell is deactivated, the ongoing Random Access procedure on the SCell, if any, may be aborted.

Example embodiments may operate considering different traffic/service types including enhanced mobile broadband (eMBB) traffic/service type and ultra-reliable low-latency communications (URLLC) traffic/service types. The eMBB traffic/service type may be related to high data rate applications where latency and reliability requirements may not be as strict as the data rate requirements. The URLLC applications may have strict requirements on latency and reliability and may require comparatively lower data rates than the eMBB traffic/service type.

Figure 16:
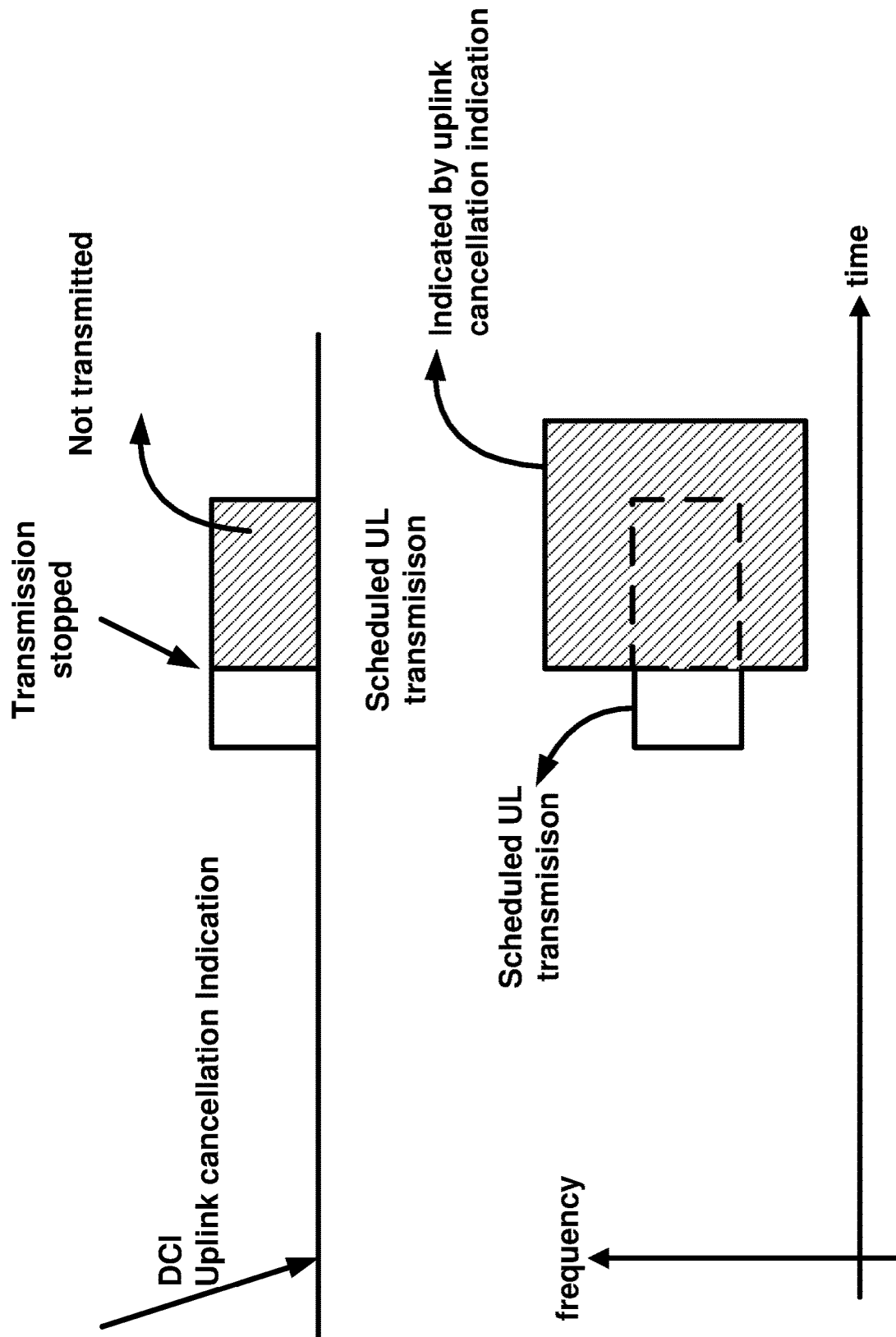
FIG. 16 shows an example uplink cancellation process in accordance with an aspect of an embodiment of the present disclosure.

In example embodiments and as shown in FIG. 16, a wireless device may be scheduled with an uplink transmission and may stop the uplink transmission due to receiving an uplink cancellation indication indicating radio resources that overlap with the uplink transmission. In an example, in response to the radio resources indicated by the uplink cancellation indication staring before the scheduled the resources, the wireless device may not start the uplink scheduled transmission. In an example the scheduled uplink transmission may correspond to an eMBB traffic/service type and the base station may indicate the uplink cancellation so that the resources indicated by the uplink cancellation may be used for scheduling transmissions (e.g., transport blocks) corresponding to URLLC traffic/service type. As shown in FIG. 16, the wireless device may start its scheduled uplink transmission due to uplink cancellation indication indicating resources that has overlap with the scheduled resources. The wireless device may not resume its transmission of the scheduled uplink transmission even if the cancelled resources end before the scheduled uplink transmission ends. The wireless device may receive a DCI, associated with an RNTI indicating uplink cancellation indication, comprising a plurality of uplink cancellation indications including an uplink cancellation indication related to the scheduled uplink transmission. The DCI may determine a relevant uplink cancellation indication based on one or more configuration parameters (e.g., uplink cancellation indication configuration parameters).

In an example, for a DL BWP configured to a UE in a serving cell, the UE may be provided by higher layers with a number of search space sets wherein, for a search space set from the search space sets, the UE may be provided one or more of the following by the IE SearchSpace: a search space set index s, by searchSpaceId, an association between the search space set s and a CORESET p by controlResourceSetId, a PDCCH monitoring periodicity of ks slots and a PDCCH monitoring offset, by monitoringSlotPeriodicityAndOffset, a PDCCH monitoring pattern within a slot, indicating first symbol(s) of the CORESET within a slot for PDCCH monitoring, by monitoringSymbolsWithinSlot, a duration of slots indicating a number of slots that the search space set s may exist by duration, a number of PDCCH candidates $M_s^{(L)}$ per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively, an indication that search space set s is either a CSS set or a USS set by searchSpaceType, if search space set s is a CSS set, an indication by dci-Format0-0-AndFormat1-0 to monitor PDCCH candidates for DCI format 0_0 and DCI format 1_0, an indication by dci-Format2-0 to monitor one or two PDCCH candidates for DCI format 2_0 and a corresponding CCE aggregation level, an indication by dci-Format2-1 to monitor PDCCH candidates for DCI format 2_1, an indication by dci-Format2-2 to monitor PDCCH candidates for DCI format 2_2, an indication by dci-Format2-3 to monitor PDCCH candidates for DCI format 2_3, if search space set s is a USS set, an indication by dci-Formats to monitor PDCCH candidates either for DCI format 0_0 and DCI format 1_0, or for DCI format 0_1 and DCI format 1_1.

In an example, if the monitoringSymbolsWithinSlot indicates to a UE to monitor PDCCH in a subset of up to three consecutive symbols that are same in every slot where the UE monitors PDCCH for all search space sets, the UE may not expect to be configured with a PDCCH SCS other than 15 kHz if the subset includes at least one symbol after the third symbol.

In an example, a UE may not expect to be provided a first symbol and a number of consecutive symbols for a CORESET that results to a PDCCH candidate mapping to symbols of different slots.

In an example, a UE may not expect any two PDCCH monitoring occasions on an active DL BWP, for a same search space set or for different search space sets, in a same CORESET to be separated by a non-zero number of symbols that is smaller than the CORESET duration.

In an example, a UE may determine a PDCCH monitoring occasion on an active DL BWP from the PDCCH monitoring periodicity, the PDCCH monitoring offset, and the PDCCH monitoring pattern within a slot. For search space set s, the UE may determine that a PDCCH monitoring occasion(s) exists in a slot with number $n_{s,f}^\mu$ in a frame with number $n_f$ if $(n_f N_{slot}^{frame,\mu} + n_{s,f}^\mu - o_s) \mod k_s = 0$. The UE may monitor PDCCH candidates for search space set s for $T_s$ consecutive slots, starting from slot $n_{s,f}^\mu$, and may not monitor PDCCH candidates for search space set s for the next $k_s - T_s$ consecutive slots.

Uplink cancellation mechanism may be used by a base station to cancel scheduled uplink transmissions for one or more wireless devices. The resources of the scheduled uplink transmissions may be used for other uplink transmissions that have strict delay and reliability requirements (for example, in URLLC applications). The uplink cancellation mechanisms may be indicated using downlink control channel signaling. It is important that the wireless devices monitors the downlink control channel to receive the signaling for the uplink cancellation indications. Existing control channel monitoring technologies may lead to a wireless device not monitoring the downlink control channel and not receiving an uplink cancellation indication. This may cause collision with the URLLC uplink transmissions leading to performance degradation of URLLC applications (for example increased delay and reduced reliability). There is a need to enhance the existing control channel monitoring technologies to enhance the URLLC performance and enable the URLLC strict delay and reliability requirements. Example embodiments enhance the control channel monitoring technologies.

Figure 17:
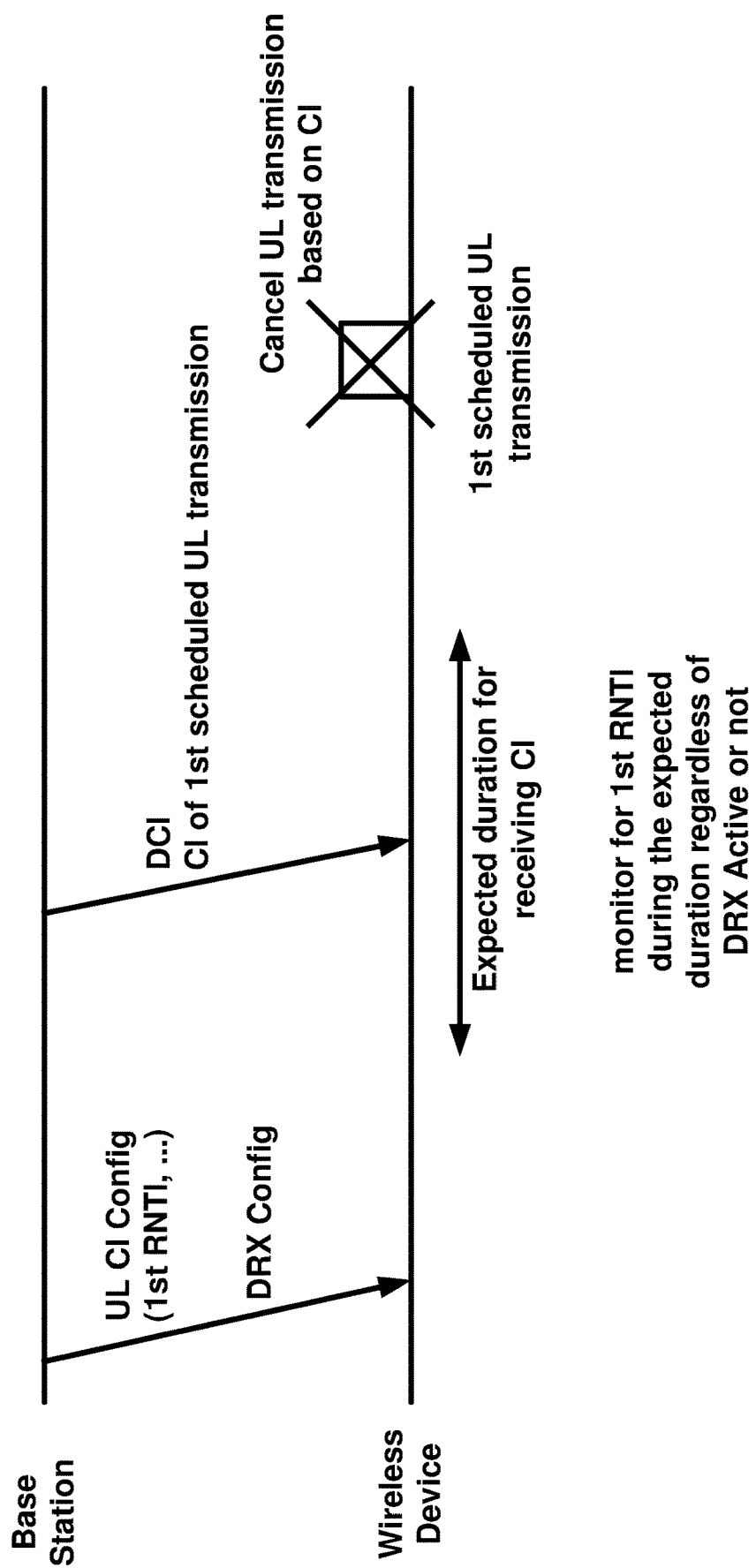
FIG. 17 shows an example process in accordance with an aspect of an embodiment of the present disclosure.

In an example embodiment as shown in FIG. 17, a wireless device may receive one or more messages comprising configuration parameters. The one or more messages may comprise one or more RRC messages. The one or more messages may comprise uplink cancellation indication configuration parameters. The uplink cancellation indication configuration parameters may comprise a first radio network temporary identifier (RNTI) associated with uplink cancellation indication. The first RNTI may be called a cancellation indication RNTI (e.g., CI-RNTI). The uplink cancellation indication configuration parameters may comprise other parameters comprising first parameters for determining an uplink cancellation indication for the wireless device in a DCI that includes a plurality of uplink cancellation indications. The one or more messages may further comprise discontinuous reception (DRX) configuration parameters. The DRX configuration parameters may comprise values of one or more timers and/or other parameters used by a DRX procedure at the wireless device for determining whether the wireless device is in DRX Active Time or not. The DRX configuration parameters may control the wireless device control channel monitoring behavior.

The wireless device may monitor a common search space of a downlink control channel for the first RNTI (e.g., RNTI associated with uplink cancellation indication), and when such monitoring for the first RNTI is expected, regardless of the wireless device being in a DRX Active time or not. In an example, the wireless device may monitor a common search space of a downlink control channel for the first RNTI, and when such monitoring for the first RNTI is expected, regardless of the wireless device being in a DRX Active time or not and in one or more downlink control channel (e.g., PDCCH) monitoring occasions. A PDCCH monitoring occasion may be a time duration (e.g., one or a consecutive number of symbols) during which the MAC entity may be configured to monitor the PDCCH.

The monitoring for the first RNTI may be expected in a time window that may be defined based on the timing of a reception of signaling indicating/scheduling the scheduled uplink transmission (e.g., a scheduling DCI) and/or a timing of the scheduled uplink transmission. In an example, the time window may be further based on a processing time for the scheduled uplink transmission and/or a capability of the wireless device (e.g., processing time capability). The wireless device may transmit, to the base station, a parameter indicating the capability (e.g., in a capability message indicating one or more wireless device capabilities). In an example, the time window may end at an offset before the timing of the scheduled uplink transmission, wherein the offset may be based on the processing time. In an example, the time window may have a fixed duration. The wireless device may determine the starting time of the time window based on the ending time of the time window and the duration of the time window. In an example, the time window may start based on a timing of reception of the signaling indicating the scheduled uplink transmission. In an example, the time window may start at or an offset after the timing of reception of the signaling indicating the scheduled uplink transmission.

In an example, when the monitoring for the first RNTI is not expected (e.g., outside the time window), the wireless device may monitor the downlink control channel for the first RNTI based on the DRX procedure. For example, when the monitoring for the first RNTI is not expected, the wireless device may monitor the downlink control channel for the first RNTI based on the wireless device being in the DRX Active Time and/or the wireless device may not monitor the downlink control channel for the first RNTI based on the wireless device not being in DRX Active Time.

In an example, when monitoring for the first RNTI is not expected, the wireless device may not monitor the downlink control channel for the first RNTI regardless of the wireless device being in a DRX Active Time or not. The wireless device may monitor the first RNTI regardless of the DRX procedures and/or the monitoring behavior of the wireless device for first RNTI may not be controlled by the DRX procedures.

Based on the monitoring the common search space of the control channel, the wireless device may receive a DCI associated with the first RNTI, wherein the DCI comprises and/or indicates an uplink cancellation indication indicating cancellation of uplink transmission on first radio resources of a scheduled uplink transmission. In an example, the scheduled uplink transmission may be for transmission of one or more transport blocks and/or uplink control information (UCI) via an uplink shared channel. In an example, the scheduled uplink transmission may be based on a configured grant. In an example, the scheduled uplink transmission may be dynamically scheduled and/or may be based on a scheduling DCI indicating an uplink grant for the scheduled uplink transmission. In an example, the scheduled uplink transmission may be for transmission of a signal. In an example, the signal may be sounding reference signal (SRS). The uplink cancellation indication may indicate one or more symbols and a plurality resource blocks wherein the wireless device may cancel its scheduled uplink transmission and/or the wireless device may stop its uplink transmission on the radio resources indicated by the uplink cancellation indication (e.g., at the starting symbol indicated by the uplink cancellation indication). In an example, the cancellation of the uplink transmission may start at a time that is within the scheduled uplink transmission (e.g., after the scheduled uplink transmission has started).

In an example, the scheduled uplink transmission may be via second radio resources and the first radio resources of the uplink transmission (to be cancelled based on the uplink cancellation indication) may be a subset of the second resources. In an example, the cancellation of the uplink transmission may be before or when the scheduled uplink transmission begins. In an example, the wireless device may not resume transmission of the scheduled uplink transmission after the uplink cancellation ends even if the scheduled uplink transmission ends after the uplink cancellation ends. The wireless device may determine the one or more symbols and the plurality of resource blocks for uplink cancellation based on the uplink cancellation indication indicated by the DCI and one or more configuration parameters configured by RRC. The wireless device may cancel the uplink transmission based on receiving the downlink control information.

Figure 18:
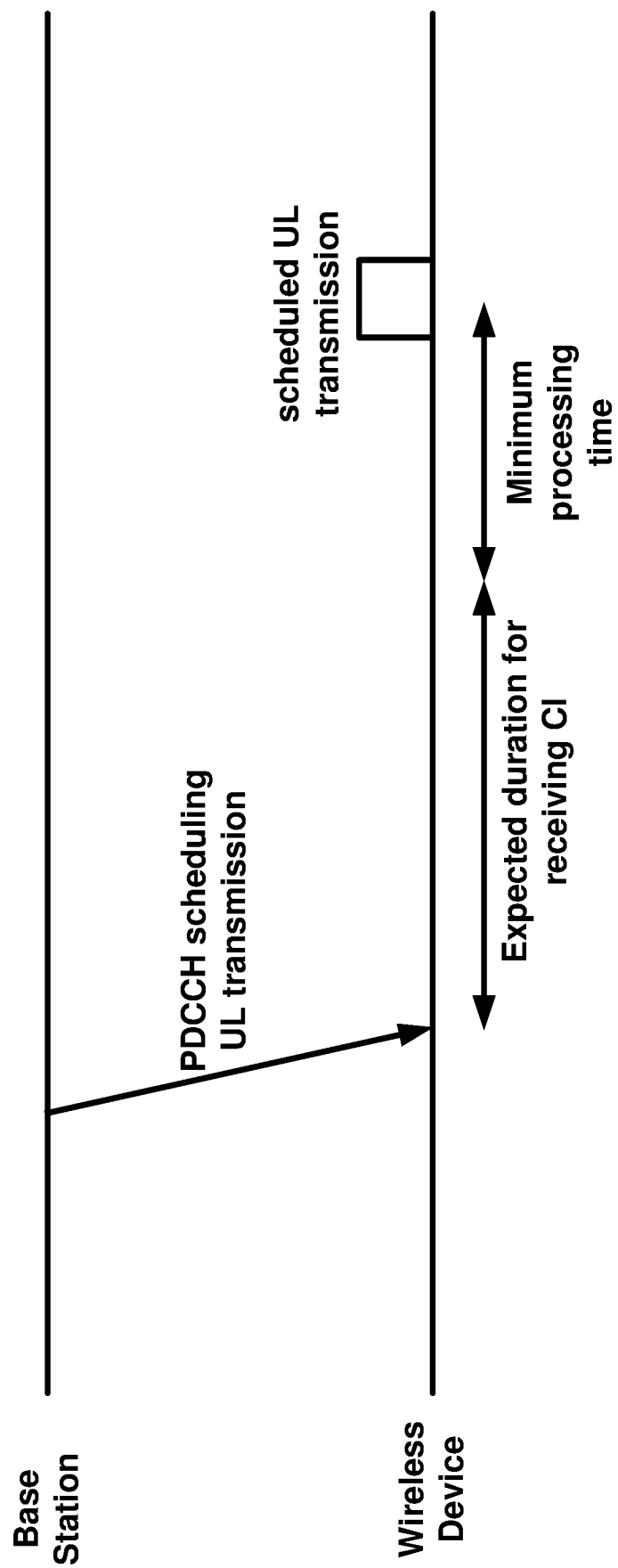
FIG. 18 shows an example process in accordance with an aspect of an embodiment of the present disclosure.
Figure 19:
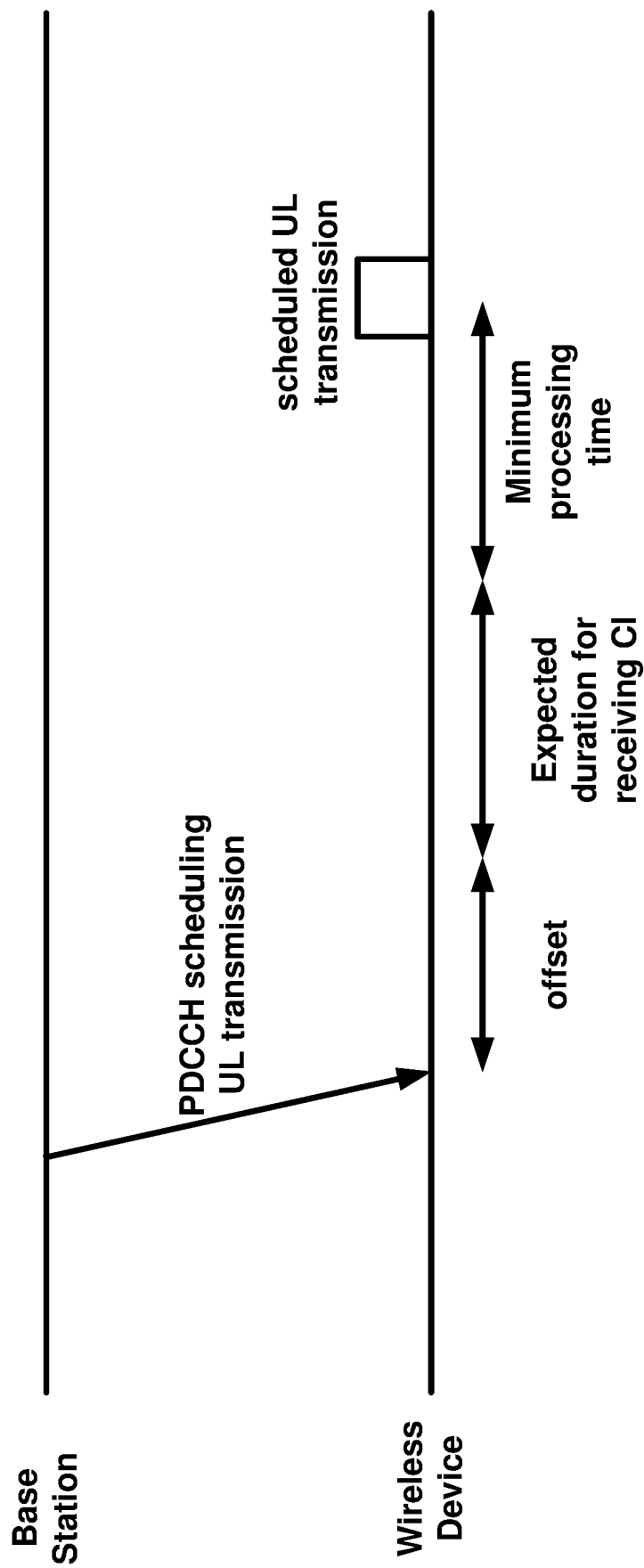
FIG. 19 shows an example process in accordance with an aspect of an embodiment of the present disclosure.

In an example embodiment as shown in FIG. 18 and FIG. 19, the wireless device may receive a first downlink control information indicating a first uplink transmission. In an example, the first downlink control information may comprise an uplink grant indicating the first uplink transmission. In an example, the first downlink control information may indicate a second uplink transmission comprising the first uplink transmission, wherein first radio resources for transmission of the first uplink transmission may be a subset of second radio resources for transmission of the second uplink transmission. A resource allocation field of the first downlink control information may indicate the second radio resources of the second uplink transmission. The first downlink control information indicating the second uplink transmission may indicate transmission via an uplink channel such as transmission of one or more transport blocks and/or UCI or may indicate transmission of an uplink signal (e.g., SRS).

The wireless device may determine, based on the DRX procedures, Active Time for control channel monitoring. The determination of the Active Time may be based on one or more DRX timers configured for the wireless device running or based on other criteria. The wireless device may monitor a common search space of a downlink control channel for the first RNTI (e.g., RNTI associated with uplink cancellation indication), and when such monitoring for the first RNTI is expected, regardless of the wireless device being in a DRX Active time or not. In an example, the wireless device may monitor a common search space of a downlink control channel for the first RNTI, and when such monitoring for the first RNTI is expected, regardless of the wireless device being in a DRX Active time or not and in one or more downlink control channel (e.g., PDCCH) monitoring occasions.

In an example, the first downlink control information may be received at a first timing. The first uplink transmission (e.g., the uplink transmission to be cancelled by the cancellation indication) may start at the second timing and the second downlink control information, associated with the first RNTI, may be expected between the first timing and the second timing.

In an example, the first downlink control information may be received at a first timing. The second uplink transmission (e.g., the uplink transmission scheduled by the first DCI) may start at the second timing and the second downlink control information, associated with the first RNTI, may be expected between the first timing and the second timing.

In an example, the second downlink control information, associated with the first RNTI, may be expected between a first offset after the first timing and the second timing. In an example, the second downlink control information, associated with the first RNTI, may be expected between the first timing and a second offset before the second timing. In an example, the second downlink control information, associated with the first RNTI, may be expected between a first offset after the first timing and a second offset before the second timing. In an example, the first offset and/or the second offset may be configured by RRC. In an example, the first offset and/or the second offset may be pre-defined/pre-configured. In an example, the second offset may be based on a processing time. In an example, the second offset may be based on a capability of the wireless device. The wireless device may transmit, to the base station, one or more messages (e.g., one or more capability messages) and may indicate the capability indicating the second offset.

Based on the monitoring the common search space of the control channel, the wireless device may receive a second DCI associated with the first RNTI, wherein the second DCI may comprise and/or may indicate an uplink cancellation indication indicating cancellation of the first uplink transmission. The uplink cancellation indication may indicate one or more symbols and a plurality resource blocks wherein the wireless device may cancel first uplink transmission of the second uplink transmission and/or the wireless device may stop the second uplink transmission on the radio resources indicated by the uplink cancellation indication that have overlap with radio resources of the second uplink transmission (e.g., at the starting symbol indicated by the uplink cancellation indication). In an example, the cancellation of the first uplink transmission may be within the second uplink transmission (e.g., after the second uplink transmission has started).

In an example, the second downlink control information may comprise a plurality of uplink cancellation indications comprising a first uplink cancellation indication indicating cancellation of the first uplink transmission. The second DCI may comprise a plurality of uplink cancellation indications for one or more wireless devices. The first uplink cancellation indication may indicate cancelation of a plurality of resources comprising resources for transmission of the first uplink transmission. The wireless device may determine the first cancellation indication in the plurality of cancellation indications of the second downlink control information. In an example, the uplink cancellation indication configuration parameters may comprise one or more parameters, wherein the determining the first uplink cancellation indication may be based on the one or more parameters.

Figure 20:
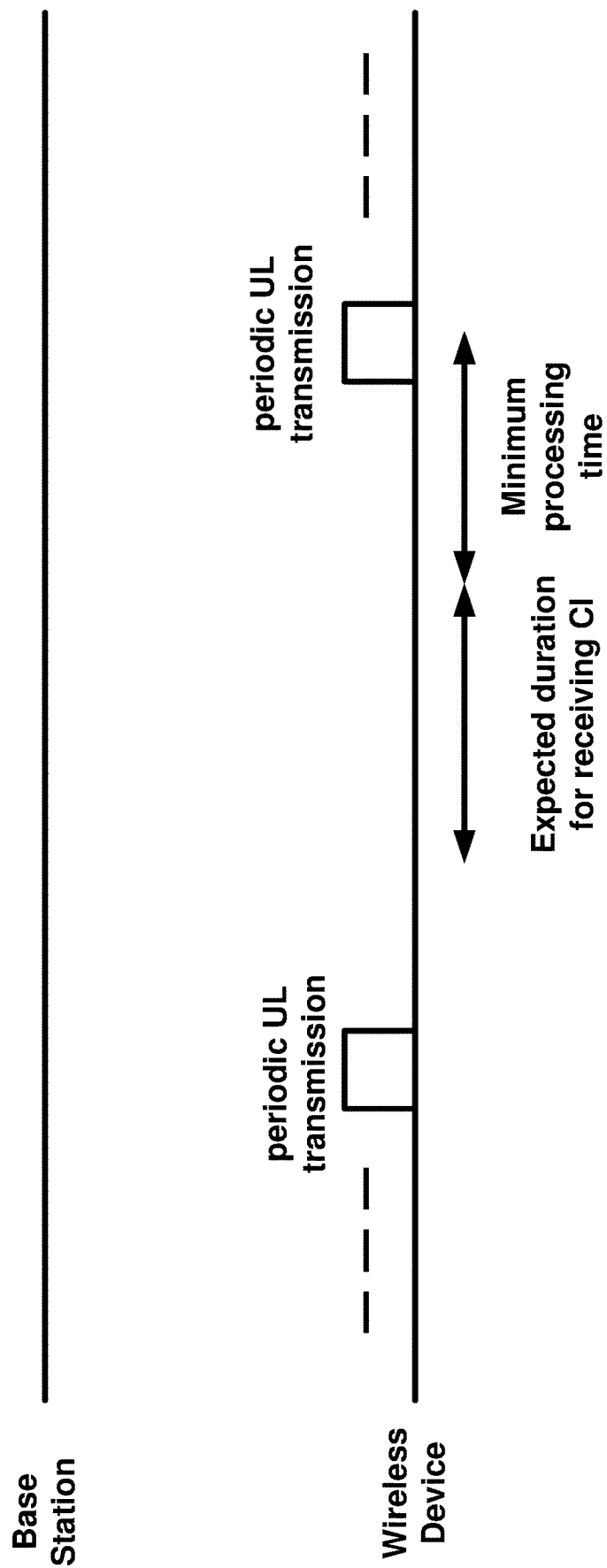
FIG. 20 shows an example process in accordance with an aspect of an embodiment of the present disclosure.

In an example embodiment as shown in FIG. 20, a wireless device may receive one or more messages comprising uplink cancellation indication configuration parameters, discontinuous reception (DRX) configuration parameters and periodic resources configuration parameters. In an example, the periodic resources configuration parameters may be for one or more configured grant configurations. In an example, the periodic resources configuration parameters may be sounding reference signal (SRS) configurations (e.g., periodic SRS resources and/or periodic SRS transmission configuration parameters).

The wireless device may determine, based on the DRX procedures, Active Time for control channel monitoring. The determination of the Active Time may be based on one or more DRX timers configured for the wireless device running or based on other criteria. The wireless device may monitor a common search space of a downlink control channel for the first RNTI (e.g., RNTI associated with uplink cancellation indication), and when such monitoring for the first RNTI is expected, regardless of the wireless device being in a DRX Active time or not. The wireless device may monitor a common search space of a downlink control channel for the first RNTI (e.g., RNTI associated with uplink cancellation indication), and when such monitoring for the first RNTI is expected and in one or more control channel (e.g., PDCCH) monitoring occasions, regardless of the wireless device being in a DRX Active time or not.

Based on the monitoring the common search space of the control channel, the wireless device may receive a second DCI associated with the first RNTI, wherein the second DCI may comprise and/or may indicate an uplink cancellation indication indicating cancellation of a first uplink transmission and wherein the first uplink transmission may be based on the periodic resources configuration parameters. The uplink cancellation indication may indicate one or more symbols and a plurality resource blocks wherein the wireless device may cancel the first uplink transmission. The wireless device may cancel the first uplink transmission based on the receiving the second downlink control channel.

In an example, the first uplink transmission may be scheduled at a first timing. The second DCI, associated with the first RNTI, may be expected before the first timing. In an example, the second DCI may be expected on or before an offset before the first timing. In an example, the offset may be configurable by RRC and/or an RRC configuration parameter may indicate the offset. In an example, the offset may be pre-configured/pre-defined. In an example, the offset may be based on a processing time and/or a capability of the wireless device. The wireless device may include the capability/processing time in a capability message comprising a plurality of wireless device capabilities and transmit the capability message to the base station.

In an example, the wireless device may receive a command/control information indicating activation of periodic resources based on the periodic resources configuration parameters. The command/control information may be based on MAC control signaling (e.g., a MAC command such as MAC CE) or physical layer control signaling (e.g., a DCI).

In an example, the command/control information for activation of the periodic resources may be a downlink control information received via a downlink control channel. The periodic resources may be configured grant resources and the periodic resources configuration may be configured grant configuration. In an example, a second uplink transmission may comprise the first uplink transmission. The first radio resources of the first uplink transmission may be a subset of second radio resources of the second uplink transmission. The second uplink transmission may be based on the configured grant/periodic resources configuration parameters.

In an example, the command/control information may be a MAC CE indicating activation of periodic SRS resources. The periodic resources may be periodic SRS resources and the periodic resources configuration may be periodic SRS configuration. A second uplink transmission, comprising the first uplink transmission, may be an SRS transmission based on the periodic SRS resources.

In an example, the second downlink control information may comprise a plurality of uplink cancellation indications comprising a first uplink cancellation indication indicating cancellation of the first uplink transmission. The second DCI may comprise a plurality of uplink cancellation indications for one or more wireless devices. The first uplink cancellation indication may indicate cancelation of a plurality of resources comprising resources for transmission of the first uplink transmission. The wireless device may determine the first cancellation indication in the plurality of cancellation indications of the second downlink control information. In an example, the uplink cancellation indication configuration parameters may comprise one or more parameters, wherein the determining the first uplink cancellation indication may be based on the one or more parameters.

Figure 21:
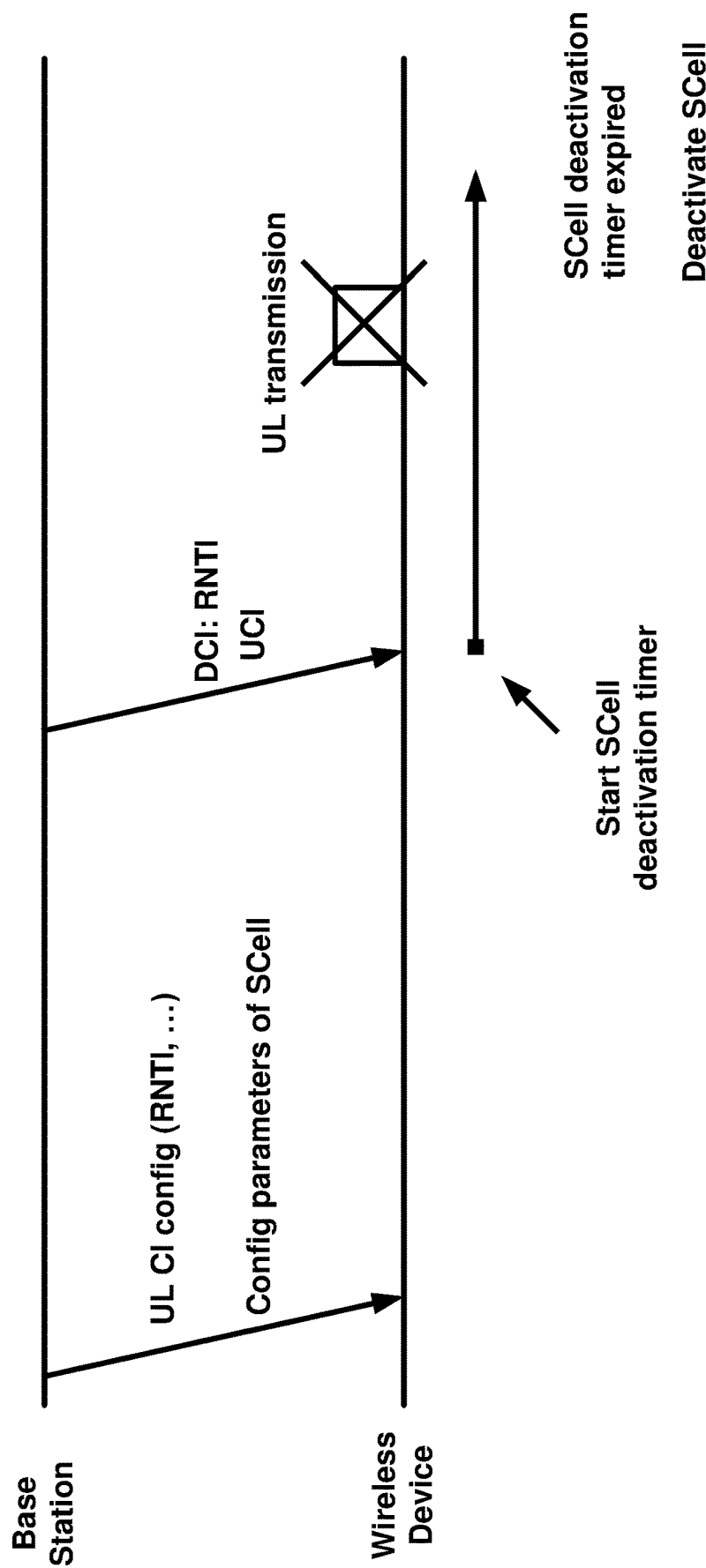
FIG. 21 shows an example process in accordance with an aspect of an embodiment of the present disclosure.
Figure 22:
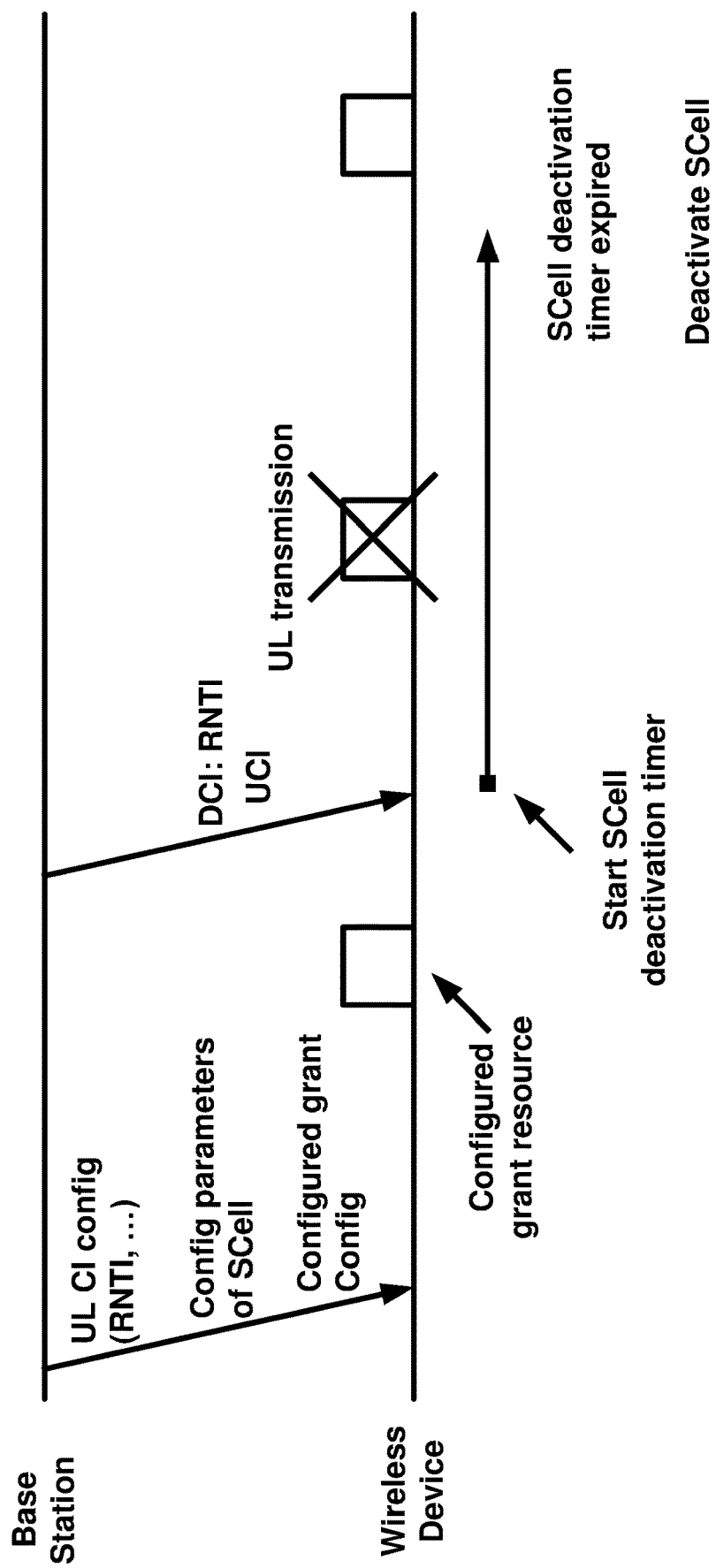
FIG. 22 shows an example process in accordance with an aspect of an embodiment of the present disclosure.

In an example embodiment as shown in FIGS. 21 and 22, a wireless device may receive one or more messages comprising configuration parameters. The one or more messages may comprise one or more RRC messages. The one or more messages may comprise uplink cancellation configuration parameters, comprising an RNTI, and configuration parameters of a secondary cell. The uplink cancellation indication configuration parameters may indicate uplink radio resources on which uplink transmission may be cancelled based on receiving an uplink cancellation indication in a DCI. The uplink cancellation indication configuration parameters may comprise parameters that may be used by the wireless device to determine the radio resources for uplink cancellation.

The wireless device may receive a DCI, associated with the RNTI, indicating cancellation of a scheduled uplink transmission on the secondary cell. The wireless device may start the deactivation timer of the secondary cell based on the receiving the DCI. Based on the deactivation timer of the secondary cell expiring, the wireless device may deactivate the secondary cell.

In an example, the uplink transmission may be a dynamically scheduled uplink transmission or a portion of the dynamically scheduled uplink transmission (e.g., radio resources of the uplink transmission may be a subset of radio resources of the dynamically scheduled uplink transmission). The wireless device may receive a second DCI comprising an uplink grant indicating the uplink transmission. The second DCI may comprise a resource allocation field indicating radio resources of the uplink transmission (e.g., indicating first resources comprising the radio resources of the uplink transmission).

In an example, the one or more messages may comprise configuration parameters of a configured grant configuration. The uplink transmission may be based on the configured grant configuration parameters. For example, the configured grant configuration parameters may indicate a first resource comprising the radio resources of the uplink transmission. In an example, the wireless device may further receive an activation DCI indicating activation of the first configured grant configuration. The wireless device may activate a plurality of resources based on the receiving the activation DCI, wherein the plurality of resources may comprise the first resource, wherein the first resource comprises radio resources of the uplink transmission. The radio resources of the uplink transmission may be a subset of the first resource. In an example, the configured grant configuration parameters may comprise a periodicity parameter, wherein the plurality of resources may be based on the periodicity parameter.

In an example, the wireless device may or may not receive a packet from upper layers (e.g., MAC layer) for the scheduling transmission. For example, an upper layer (e.g., MAC) may determine, based on a skipping procedure, whether to skip or not skip a scheduled transmission. In an example, the starting the deactivation timer based on the receiving the DCI (e.g. the uplink cancellation DCI) may be independent of the wireless device having a packet for transmission based on the scheduled transmission or skipping the scheduled transmission. In an example, the starting the deactivation timer based on the receiving the DCI (e.g. the uplink cancellation DCI) may be independent of skipping or not skipping the scheduled transmission.

In an example, the one or more messages may further comprise a parameter indicating a deactivation timer of the secondary cell. The deactivation of the secondary cell may be specific to the secondary cell and different secondary cells may be configured with different deactivation timer values. The starting the deactivation timer of the secondary cell may be with configured deactivation timer value.

In an example embodiment, a wireless device may receive one or more messages comprising: uplink cancellation indication configuration parameters comprising a first radio network temporary identifier (RNTI); and discontinuous reception (DRX) configuration parameters. The wireless device may monitor, for the first radio network identifier and when such is expected, a common search space regardless of the wireless device being in DRX Active Time or not. Based on the monitoring, the wireless device may receive a downlink control information, associated with the first RNTI, indicating cancellation of uplink transmission on first radio resources of a scheduled uplink transmission. The wireless device may cancel the uplink transmission based on the receiving the downlink control information.

In an example, the scheduled uplink transmission may be via second radio resources; and the first radio resources may be a subset of the second radio resources.

In an example, the cancelling the uplink transmission may comprise stopping transmission in the middle of the scheduled uplink transmission.

In an example, scheduled uplink transmission may be for transmission of a transport block and/or uplink control information via an uplink shared channel. In an example, the scheduled uplink transmission is based on a configured grant resource. In an example, the scheduled uplink transmission is dynamically scheduled based on a scheduling DCI.

In an example, the scheduled uplink transmission may be for transmission of an uplink signal. In an example, the uplink signal may be a sounding reference signal.

In an example embodiment, a wireless device may receive one or more messages comprising: uplink cancellation indication configuration parameters comprising a first radio network temporary identifier; and discontinuous reception (DRX) configuration parameters. The wireless device may receive a first downlink control information indicating a first uplink transmission. The wireless device may monitor, for the first radio network identifier and when such is expected, a common search space regardless of the wireless device being in DRX Active Time or not. The wireless device may receive, based on the monitoring, a second downlink control information, associated with the first RNTI, indicating cancellation of the first uplink transmission. The wireless device may cancel the first uplink transmission based on the receiving the second downlink control information.

In an example, the first downlink transmission may comprise an uplink grant indicating the first uplink transmission. In an example, the first downlink information may indicate a second uplink transmission comprising the first uplink transmission. In an example, first radio resources for transmission of the first uplink transmission may be a subset of second radio resources for transmission of the second uplink transmission.

In an example, the first downlink control information may be received at a first timing. The first uplink transmission may be scheduled, by the first downlink control information, at a second timing. In an example, the second downlink control information, associated with the first radio network identifier, may be expected between the first timing and the second timing. In an example, the second downlink control information, associated with the first radio network identifier, may be expected between a first offset after the first timing and a second offset before the second timing. In an example, the second downlink control information, associated with the first radio network identifier, may be expected between the first timing and a second offset before the second timing. In an example, the second downlink control information, associated with the first radio network identifier, may be expected between a first offset after the first timing and the second timing. In an example the first offset and/or the second offset may be configured (e.g., by one or more RRC parameters) or may be based on/indicated by one or more RRC parameters. In an example the first offset and/or the second offset may have a pre-configured/pre-defined value.

In an example, the first uplink transmission may be via a physical uplink shared channel.

In an example, the first uplink transmission may be a sounding reference signal transmission. In an example, a sounding reference signal request field of the first downlink control information may indicate the transmission of the sounding reference signal.

In an example, the wireless device may determine, based on the DRX configuration parameters, whether the wireless device is in DRX Active Time or not (e.g., when such is expected).

In an example, the second downlink control information may comprise a plurality of uplink cancellation indications comprising a first uplink cancellation indication indicating cancellation of the first uplink transmission. In an example, the first uplink cancellation indication may indicate a plurality of radio resources comprising radio resources for transmission of the first uplink transmission. In an example, the wireless device may determine the first uplink cancellation indication in the plurality of uplink cancellation indications. In an example, the uplink cancellation indication configuration parameters may comprise one or more parameters; and the determining the first uplink cancellation indication, in the plurality of uplink cancellation indications, may be based on the one or more parameters.

In an example embodiment, a wireless device may receive one or more messages comprising: uplink cancellation indication configuration parameters comprising a first radio network temporary identifier; discontinuous reception (DRX) configuration parameters; and periodic resources configuration parameters. The wireless device may monitor, for the first radio network identifier and when such is expected, a common search space regardless of the wireless device being in DRX Active Time or not. The wireless device may receive, based on the monitoring, a second downlink control information, associated with the first RNTI, indicating cancellation of a first uplink transmission, wherein the first uplink transmission may be based on the periodic resources configuration parameters. The wireless device may cancel the first uplink transmission based on the receiving the second downlink control information.

In an example, the wireless device may receive a command/control information indicating activation of periodic resources based on the periodic resources configuration parameters. In an example, the command/control information may be a MAC command. In an example, the command/control information may be based on physical layer signaling.

In an example, the control information may be received based on a downlink control channel; and the periodic resources may be configured grants. In an example, a second uplink transmission, comprising the first uplink transmission, may be based on the configured grant configuration parameters. In an example, the first radio resources, for transmission of the first uplink transmission, may be a subset of second radio resources for transmission of the second uplink transmission.

In an example, the command may be a MAC control element; and the periodic resources may be sounding reference signal resources. In an example, a second uplink transmission, comprising the first uplink transmission, is a sounding reference signal transmission based on the sounding reference signal resources.

In an example, the first uplink transmission may be scheduled at a first timing. The second downlink control information, associated with the first radio network identifier, may be expected before the first timing. In an example, the second downlink control information, associated with the first radio network identifier, may be expected before an offset before the first timing. In an example, the offset may be configured and/or indicated by an RRC parameter. In an example, the offset may have a pre-configured/pre-defined value. In an example, the offset may be based on a capability of the wireless device.

In an example, the wireless device may determine, based on the DRX configuration parameters, whether the wireless device is in DRX Active Time or not (e.g., when such is expected).

In an example, the second downlink control information may comprise a plurality of uplink cancellation indications comprising a first uplink cancellation indication indicating cancellation of the first uplink transmission. In an example, the first uplink cancellation may indicate a plurality of radio resources comprising radio resources for transmission of the first uplink transmission. In an example, the wireless device may determine the first uplink cancellation indication in the plurality of uplink cancellation indications. In an example, the uplink cancellation indication configuration parameters may comprise one or more parameters; and the determining the first uplink cancellation indication may be based on the one or more parameters.

In an example embodiment, a wireless device may receive one or more messages comprising: uplink cancellation configuration parameters comprising an RNTI; and configuration parameters of a secondary cell. The wireless device may receive a DCI, associated with the RNTI, indicating cancellation of a scheduled uplink transmission on the secondary cell. The wireless device may start a deactivation timer based on the receiving the DCI. The wireless device may deactivate the secondary cell based on the deactivation timer expiring.

In an example, the uplink transmission may be based on a dynamic grant indicated by a second DCI.

In an example, the one or more messages may further comprise configured grant configuration parameters of a configured grant configuration; and the uplink transmission is based on the configured grant configuration parameters. In an example, the wireless device may receive an activation DCI indicating activation of a plurality of resources comprising a first resource for a first uplink transmission comprising the uplink transmission. In an example, radio resources of the uplink transmission may be a subset of radio resources of the first uplink transmission. In an example, the configured grant configuration parameters comprise a periodicity parameter; and the plurality of resources may be based on the periodicity.

In an example, the starting the deactivation timer based on the receiving the DCI may be independent of the wireless device having a packet for transmission based on the scheduled transmission or skipping the scheduled transmission. In an example, the starting the deactivation timer based on the receiving the DCI may be independent of skipping or not skipping the scheduled transmission.

In an example, the one or more messages further comprise parameter indicating a deactivation timer value for the secondary cell. In an example, the starting the deactivation timer may be with the deactivation timer value.

In an example, the DCI may comprise a plurality of uplink cancellation indications comprising a first uplink cancellation indication indicating the cancellation of the uplink transmission of the secondary cell. The wireless device may determine the first uplink cancellation indications in the plurality of uplink cancellation indications. The wireless device may determine the first uplink cancellation indication based on the one or more parameters.

In an example, the DCI may be a group common DCI; and the receiving the DCI may be based on a common search space.

Uplink cancellation may be a mechanism used for realizing the strict latency and reliability requirements of the ultra-reliable low-latency (URLLC) applications and services. The base station may transmit downlink control signaling, using a common downlink signaling, indicating radio resources that are cancelled and indicating that the uplink transmissions that at least partially overlap with the indicated radio resources are cancelled. Existing control channel monitoring solutions may be inefficient for reception of the common downlink signaling. Moreover, existing SCell deactivation procedures may lead to unnecessary SCell deactivation and lead to degraded wireless device and network performance. There is a need to enhance the control channel monitoring mechanisms and the SCell deactivation procedure. Example embodiments enhance the control channel monitoring and the SCell deactivation procedures.

Figure 23:
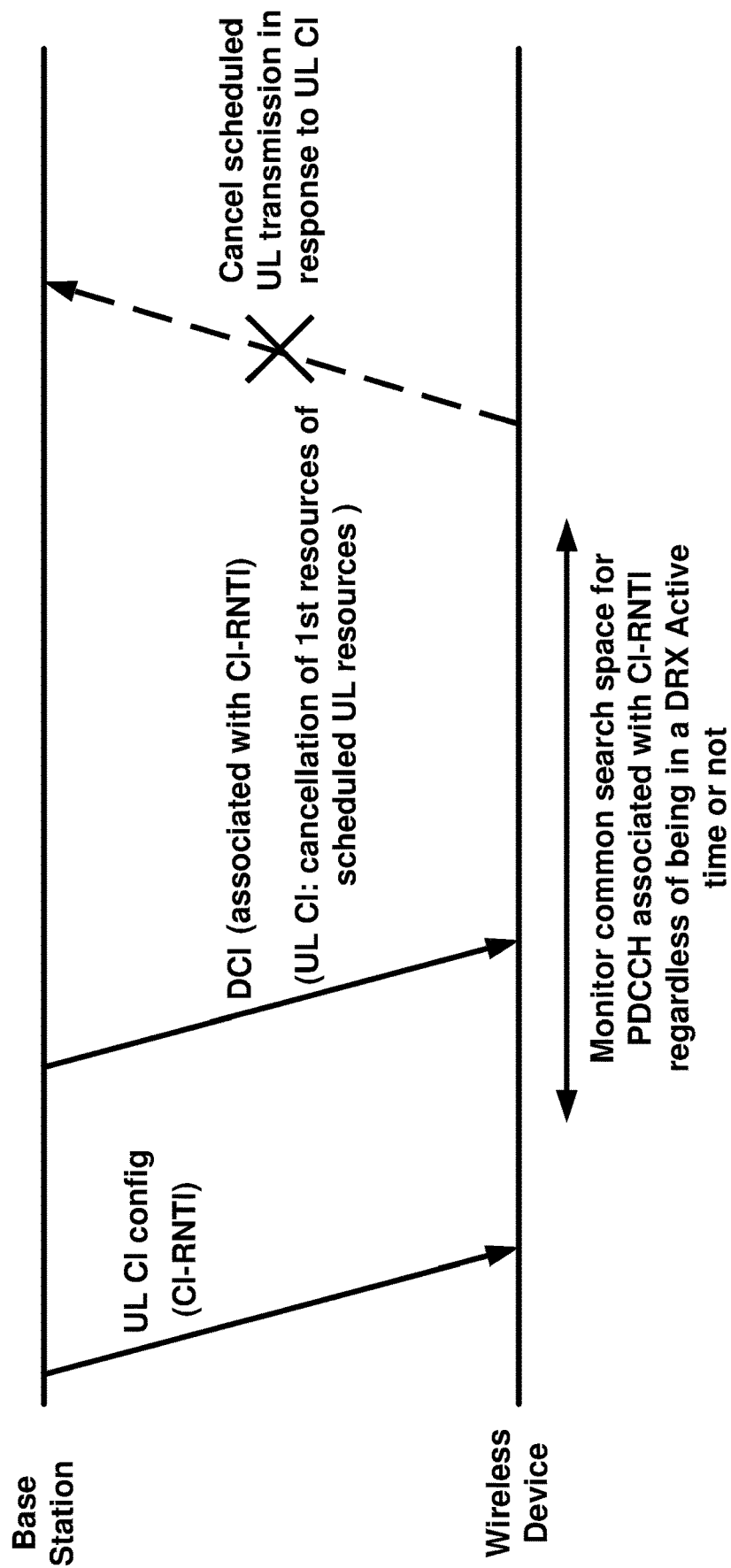
FIG. 23 shows an example uplink cancellation indication process in accordance with an aspect of an embodiment of the present disclosure.

In an example embodiment as shown in FIG. 23, a wireless device may receive one or more messages comprising configuration parameters. The one or more messages may comprise one or more RRC messages. The configuration parameters may comprise uplink cancellation indication configuration parameters. The uplink cancellation configuration parameters may comprise a cancellation indication radio network temporary identifier (CI-RNTI). The uplink cancellation configuration parameters may be used by the wireless device to monitor a downlink control channel (e.g., PDCCH) for the CI-RNTI and for receiving a cancellation indication downlink control information comprising uplink cancellation indications. The uplink cancellation configuration parameters may further comprise a parameter indicating a payload size of the cancellation indication DCI, one or more parameters for determining a cancellation indication from a plurality of cancellation indication parameters included in the cancellation indication DCI, one or more parameters for determining a time and frequency region (e.g., a plurality of radio resources) in which uplink transmissions are cancelled, etc. For example, the uplink cancellation configuration parameters may comprise an offset parameter for determining a symbol first symbol (e.g., a starting symbol) of the plurality of radio resources for which the uplink transmissions are cancelled.

The wireless device may monitor a common search space for a control channel (e.g., PDCCH) for the CI-RNTI during a time window. The time window (e.g., the start time, the end time and/or the duration of the time window) may be based on a timing of a scheduled uplink transmission. For example, the end timing of the time window may be an offset before the timing of the scheduled uplink transmission. In an example, the scheduled uplink transmission may be a scheduled physical uplink shared channel (PUSCH) transmission or a scheduled sounding reference signal (SRS) transmission. For example, the wireless device may receive a scheduling DCI comprising scheduling information for transmission of a transport block (TB) via the PUSCH and at the timing. For example, the wireless device may receive a DCI comprising an SRS request field, a value of the SRS request field indicating a request for SRS transmission and the SRS transmission may be scheduled at the timing. In an example, the starting time of the time window may further be based on a first timing of DCI that scheduled the uplink transmission (e.g., the PUSCH or the SRS). For example, the starting time of the time window may be an offset from the first timing of the DCI. In an example, the offset may be a configurable parameter (e.g., based on an RRC parameter). In an example, the offset may be based on a processing time (e.g., the processing time of the DCI).

In an example, the scheduled uplink transmission may be scheduled without dynamic scheduling, for example may be via a configured grant resource, configured for transmission of a configured grant PUSCH at the timing, or may be based on a periodic SRS transmission. For example, the wireless device may receive SRS configuration parameters and the transmission of the SRS or the periodic SRS may be based on the SRS configuration parameters. For example, the wireless device may receive configured grant configuration parameters (e.g., periodicity, parameters for determining configured grant radio resources, etc.) and the transmission of the scheduled uplink transmission may be via a configured grant resource. The wireless device may determine the configured grant resource based on the configured grant configuration parameters.

The wireless device may monitor the common search space for the control channel (e.g., PDCCH) associated with the CI-RNTI during the time window and irrespective/regardless of whether the wireless device is in a continuous reception (DRX) Active Time or not. In an example, the wireless device may receive DRX configuration parameters and may determine to be in a DRX Active Time or not to be in a DRX Active Time during the time window based on the DRX configuration parameters and using a DRX procedure. In an example, the wireless device may receive DRX configuration parameters and may determine to be in the DRX Active Time or not to be in the DRX Active Time at least during a portion of the time window based on the DRX configuration parameters and using a DRX procedure. The monitoring of the common search space for the control channel (e.g., PDCCH) associated with the CI-RNTI during the time window may be independent of the DRX state (e.g., whether the wireless device in the DRX Active Time or not) of the wireless device.

The wireless device may receive a cancellation indication DCI. The cancellation indication DCI may be associated with the CI-RNTI. The wireless device may receive the cancellation indication DCI based on monitoring the common search space for the control channel associated with the CI-RNTI. The cancellation indication DCI may comprise a plurality of cancellation indications and the wireless device may determine a cancellation indication, in the plurality of cancellation indications, based on the cancellation indication configuration parameters. The cancellation indication, determined based on the cancellation indication DCI and based on the cancellation indication configuration parameters, may indicate a plurality of resources for which the uplink transmissions are to be cancelled by the wireless devices for which the cancellation indication applies. The plurality of resources may overlap, at least partially with the first radio resources of the scheduled uplink transmission (e.g., the scheduled PUSCH or the scheduled SRS at the timing). Based on the determination that the plurality of resources, indicated by the cancellation indication, at least partially overlap with the first resources of the scheduled uplink transmission, the wireless device may cancel the scheduled uplink transmission.

Figure 24:
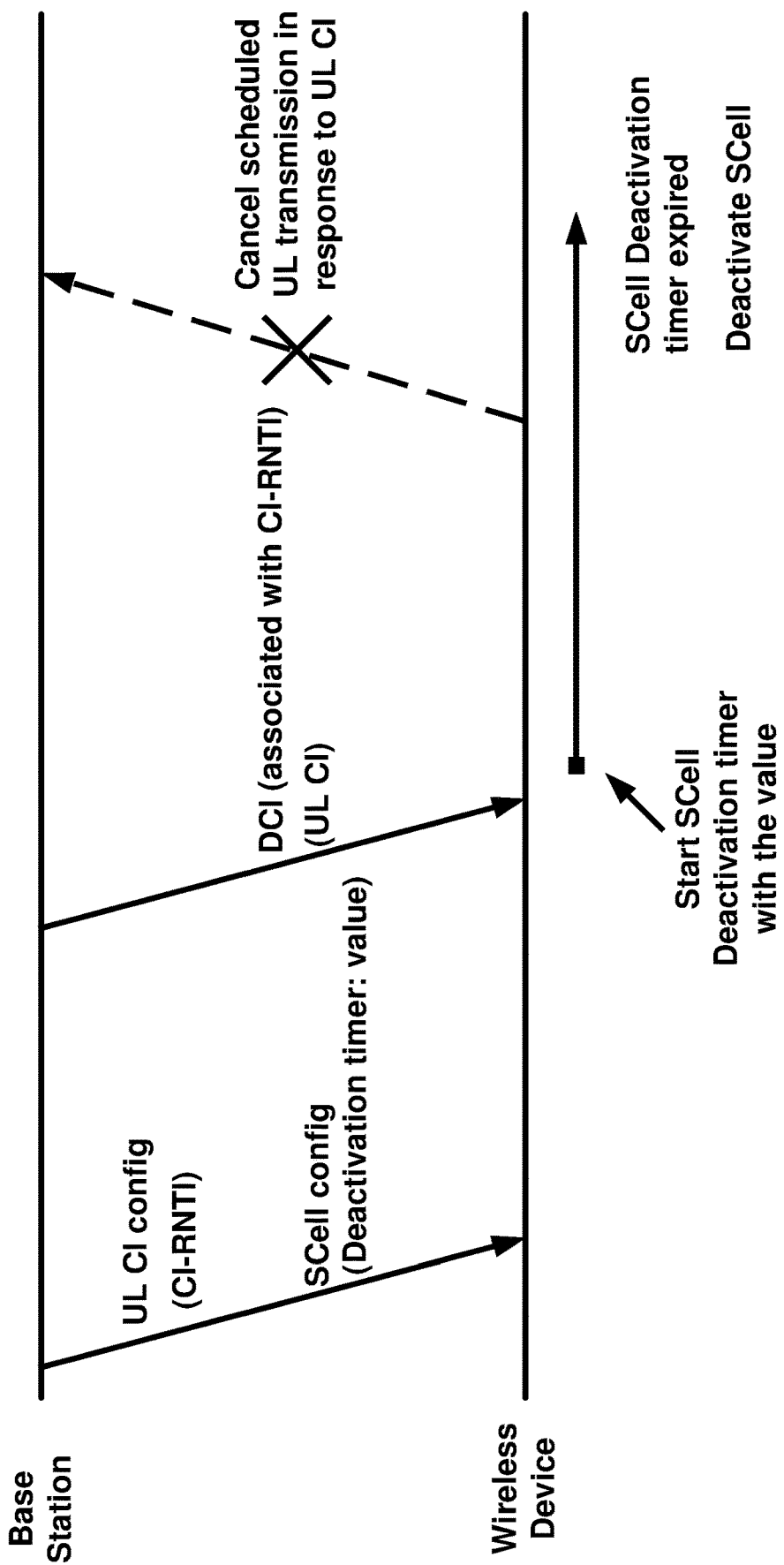
FIG. 24 shows an example secondary cell deactivation process in accordance with an aspect of an embodiment of the present disclosure.

In an example embodiment as shown in FIG. 24, a wireless device may receive one or more messages comprising configuration parameters. The one or more messages may comprise one or more RRC messages. The configuration parameters may comprise uplink cancellation indication configuration parameters. The uplink cancellation configuration parameters may comprise a cancellation indication radio network temporary identifier (CI-RNTI). The uplink cancellation configuration parameters may be used by the wireless device to monitor a downlink control channel (e.g., PDCCH) for the CI-RNTI and for receiving a cancellation indication downlink control information comprising uplink cancellation indications. The uplink cancellation configuration parameters may further comprise a parameter indicating a payload size of the cancellation indication DCI, one or more parameters for determining a cancellation indication from a plurality of cancellation indication parameters included in the cancellation indication DCI, one or more parameters for determining a time and frequency region (e.g., a plurality of radio resources) in which uplink transmissions are cancelled, etc. For example, the uplink cancellation configuration parameters may comprise an offset parameter for determining a symbol first symbol (e.g., a starting symbol) of the plurality of radio resources for which the uplink transmissions are cancelled.

The one or more message may comprise configuration parameters of a plurality of cells. The plurality of cells may comprise a primary cell and one or more secondary cells comprising a first secondary cell. The configuration parameters of the first secondary cell may comprise a value of a deactivation timer for the first secondary cell. The wireless device may deactivate the secondary cell based on a SCell deactivation procedure and based on the deactivation timer of the first secondary cell expiring.

The wireless device may receive a cancellation indication DCI. The cancellation indication DCI may be associated with the CI-RNTI. The wireless device may receive the cancellation indication DCI based on monitoring the common search space for the control channel associated with the CI-RNTI. The cancellation indication DCI may comprise a plurality of cancellation indications and the wireless device may determine a cancellation indication, in the plurality of cancellation indications, based on the cancellation indication configuration parameters. The cancellation indication, determined based on the cancellation indication DCI and based on the cancellation indication configuration parameters, may indicate a plurality of resources for which the uplink transmissions are to be cancelled by the wireless devices for which the cancellation indication applies. The plurality of resources may overlap, at least partially with the first radio resources of a scheduled uplink transmission (e.g., a scheduled PUSCH). Based on the determination that the plurality of resources, indicated by the cancellation indication, at least partially overlap with the first resources of the scheduled uplink transmission, the wireless device may cancel the scheduled uplink transmission. The wireless device may further start the SCell Deactivation timer, associated with the first secondary cell, based on receiving the cancellation indication DCI. The wireless device may further start the SCell Deactivation timer, associated with the first secondary cell, based on receiving the cancellation indication DCI and based on the cancellation indication DCI indicating cancellation of the scheduled uplink transmission. The wireless device may use the SCell deactivation procedure and may deactivate the first secondary cell based on the SCell Deactivation timer, associated with the first secondary cell, expiring.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

Figure 25:
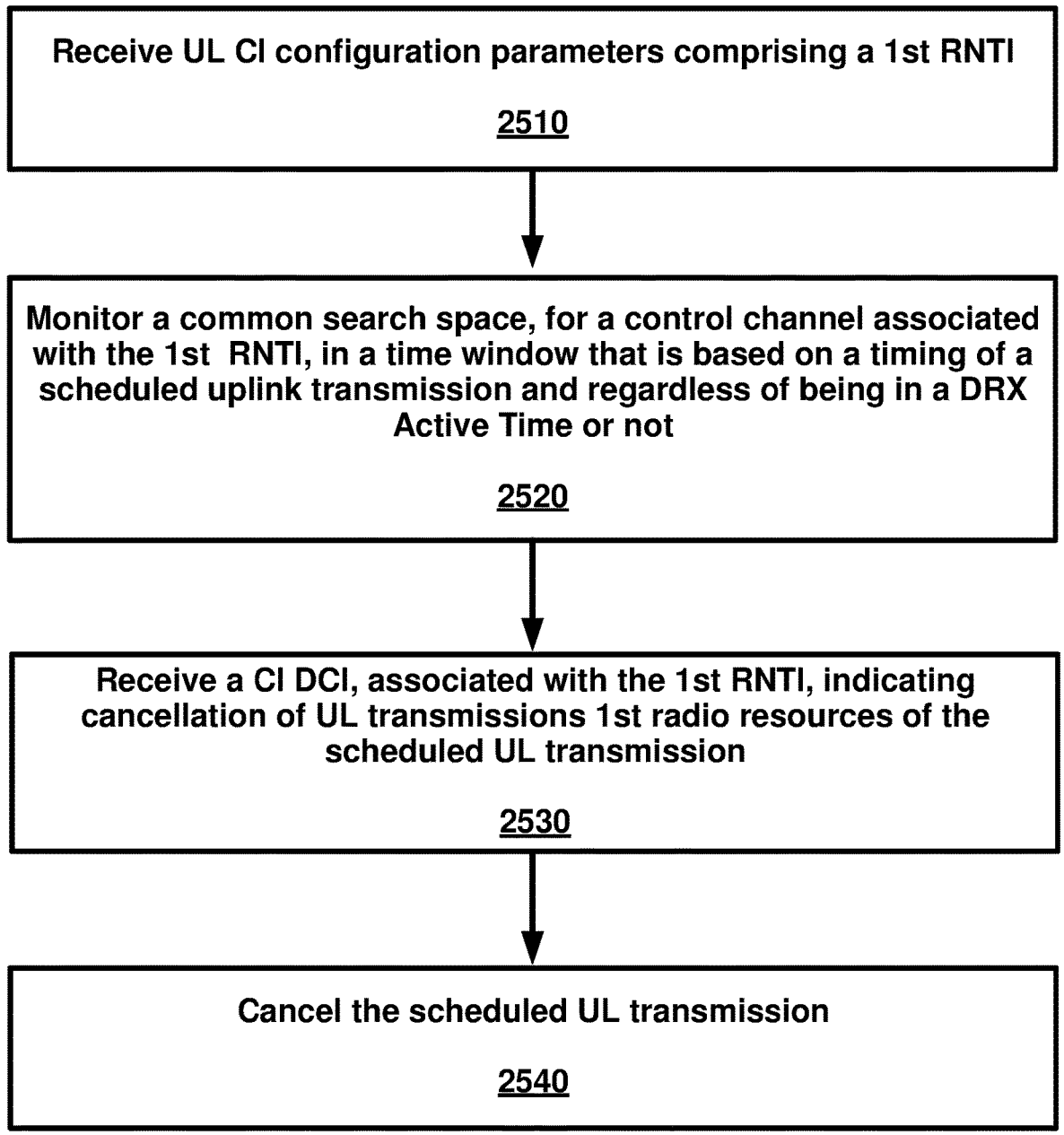
FIG. 25 shows an example flow diagram in accordance with several of various embodiments of the present disclosure.

FIG. 25 shows an example flow diagram in accordance with several of various embodiments of the present disclosure. At 2510, a wireless device may receive uplink cancellation indication configuration parameters comprising a first radio network temporary identifier (RNTI). At 2520, the wireless device may monitor a common search space, for a control channel associated with the first RNTI, in a time window that is based on a timing of a scheduled uplink transmission and regardless of being in a discontinuous reception (DRX) Active Time or not. At 2530, the wireless device may receive a cancellation indication downlink control information, associated with the first RNTI, indicating cancellation of uplink transmissions on first radio resources of the scheduled uplink transmission. At 2540, the wireless device may cancel the scheduled uplink transmission.

In an example embodiment, the wireless device may further receive a downlink control information comprising scheduling information for the scheduled uplink transmission at 2520. In an example embodiment, the time window may further be based on a first timing of the downlink control information. In an example embodiment, a starting time of the time window may be an offset from the first timing of the downlink control information. In an example embodiment, the wireless device may further receive, at 2510, a configuration parameter indicating the offset.

In an example embodiment, the scheduled uplink transmission, at 2520, may be via a physical uplink shared channel (PUSCH).

In an example embodiment, the scheduled uplink transmission, at 2520, may be a sounding reference signal (SRS).

In an example embodiment, the cancellation indication downlink control information, received at 2530, may comprise an uplink cancellation indication indicating cancellation of uplink transmissions on a plurality of radio resources comprising the first radio resources.

In an example embodiment, the uplink cancellation indication configuration parameters, received at 2510, may comprise an offset parameter indicating a number of symbols from the cancellation indication downlink control information, received at 2530, for determining a first symbol of the plurality of radio resources.

In an example embodiment, an end time of the time window, at 2520, may be an offset before the timing of the scheduled uplink transmission. In an example, the offset may be based on a processing time.

In an example embodiment, the wireless device may further receive, at 2510, periodic resource configuration parameters, wherein the scheduled uplink transmission may be based on the periodic resource configuration parameters. In an example embodiment, the periodic resource configuration parameters comprise at least one of: configured grant configuration parameters; and periodic sounding reference signal (SRS) configuration parameters.

In an example embodiment, the wireless device may further receive, at 2510, DRX configuration parameters, wherein: the DRX configuration parameters comprise a value of a first DRX timer; and the wireless device is, at 2520, in the DRX Active Time based on the first DRX timer running.

In an example embodiment, the wireless device may further receive, at 2510, DRX configuration parameters. The wireless device may determine that the wireless device is not in the DRX Active Time, at 2520, based on the DRX configuration parameters.

Figure 26:
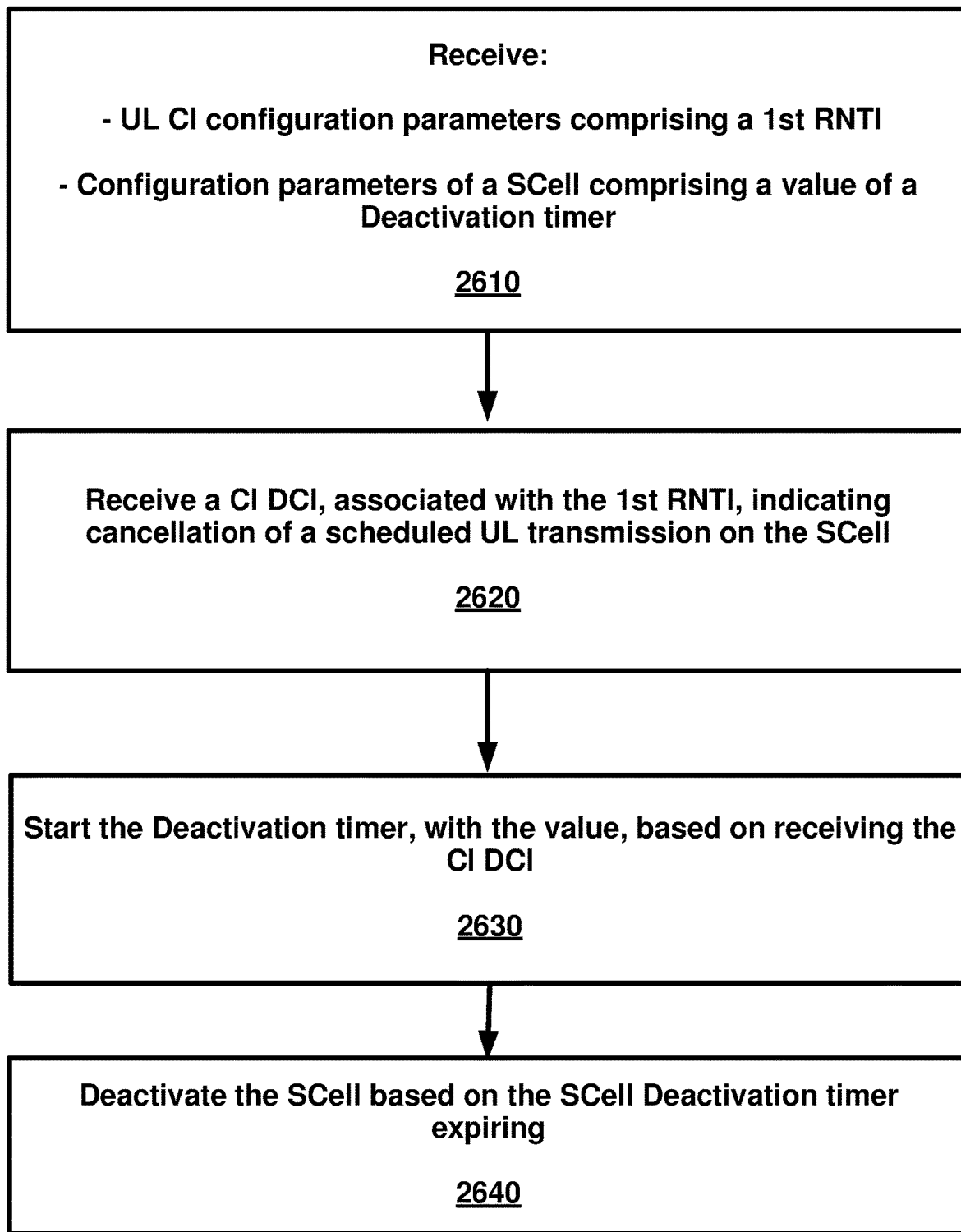
FIG. 26 shows an example flow diagram in accordance with several of various embodiments of the present disclosure.

FIG. 26 shows an example flow diagram in accordance with several of various embodiments of the present disclosure. At 2610, a wireless device may receive: uplink cancellation indication configuration parameters comprising a first radio network temporary identifier (RNTI); and configuration parameters of a secondary cell comprising a value of a deactivation timer. At 2620, the wireless device may receive a cancellation indication downlink control information, associated with the first RNTI, indicating cancellation of a scheduled uplink transmission on the secondary cell. At 2630, the wireless device may start the deactivation timer, with the value, based on receiving the cancellation indication downlink control information. At 2640, the wireless device may deactivate the secondary cell based on the deactivation timer expiring.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:
   receiving, by a wireless device, uplink cancellation indication configuration parameters comprising:
      a first radio network temporary identifier (RNTI) used for cancellation indication; and
      an offset parameter indicating a number of symbols, from a cancellation indication downlink control information, for determining a first symbol of a plurality of radio resources;
   monitoring a control channel in a common search space, for the first RNTI, in a time window that is based on a timing of a scheduled uplink transmission and regardless of being in a discontinuous reception (DRX) Active Time or not;
   receiving a cancellation indication downlink control information, associated with the first RNTI, comprising an uplink cancellation indication indicating cancellation of uplink transmissions on the plurality of radio resources comprising first radio resources of the scheduled uplink transmission; and
   cancelling the scheduled uplink transmission.

2. The method of claim 1, further comprising receiving a first downlink control information comprising scheduling information for the scheduled uplink transmission.

3. The method of claim 2, wherein the time window is further based on a first timing of the first downlink control information.

4. The method of claim 3, wherein a starting time of the time window is an offset from the first timing of the first downlink control information.

5. The method of claim 4, further comprising a configuration parameter indicating the offset.

6. The method of claim 2, wherein the scheduled uplink transmission is via a physical uplink shared channel (PUSCH).

7. The method of claim 2, wherein the scheduled uplink transmission is a sounding reference signal (SRS).

8. The method of claim 2, wherein an end time of the time window is an offset before the timing of the scheduled uplink transmission.

9. The method of claim 1, wherein an end time of the time window is an offset before the timing of the scheduled uplink transmission.

10. The method of claim 9, wherein the offset is based on a processing time.

11. The method of claim 1, wherein the scheduled uplink transmission is via a physical uplink shared channel (PUSCH).

12. The method of claim 1, wherein the scheduled uplink transmission is a sounding reference signal (SRS).

13. The method of claim 1, further comprising receiving periodic resource configuration parameters, wherein the scheduled uplink transmission is based on the periodic resource configuration parameters.

14. The method of claim 13, wherein the periodic resource configuration parameters comprise at least one of:
    configured grant configuration parameters; and
    periodic sounding reference signal (SRS) configuration parameters.

15. The method of claim 1, further comprising receiving DRX configuration parameters, wherein:
    the DRX configuration parameters comprise a value of a first DRX timer; and
    the wireless device is in the DRX Active Time based on the first DRX timer running.

16. The method of claim 1, further comprising:
    receiving DRX configuration parameters; and
    determining that the wireless device is not in the DRX Active Time based on the DRX configuration parameters.

* * * * *